(12) United States Patent
Bartok

(10) Patent No.: US 6,225,589 B1
(45) Date of Patent: May 1, 2001

(54) ELECTRIC DISCHARGE MACHINING APPARATUS

(76) Inventor: Stephen Bartok, 5687 Mistridge Dr., Rancho Palos Verdes, CA (US) 91275

(*) Notice: Subject to any disclaimer, the term of this patent is extended or adjusted under 35 U.S.C. 154(b) by 0 days.

(21) Appl. No.: 09/268,905

(22) Filed: Mar. 15, 1999

(51) Int. Cl.[7] .................................................. B23H 1/00

(52) U.S. Cl. ................................. 219/69.15; 219/69.16; 219/69.17; 219/69.2

(58) Field of Search ............................... 219/69.16, 69.2, 219/69.15, 69.17, 69.12

(56) References Cited

U.S. PATENT DOCUMENTS

| | | | |
|---|---|---|---|
| 4,135,378 | * 1/1979 | Balon . | |
| 4,361,745 | 11/1982 | Rupert | 219/69.16 |
| 4,543,460 | 9/1985 | Inoue | 219/69.17 |
| 4,596,066 | * 6/1986 | Inoue | 219/69.15 |
| 4,606,007 | 8/1986 | Inoue | 364/474 |
| 4,608,476 | 8/1986 | Shimizu | 219/69.17 |
| 4,629,855 | 12/1986 | Inoue | 219/69.12 |
| 4,721,838 | 1/1988 | Abdukarimov | 219/69.15 |
| 4,855,558 | * 8/1989 | Ramsbro | 219/69.15 |
| 5,051,554 | 9/1991 | Tsukamoto | 219/61.19 |
| 5,159,167 | * 10/1992 | Chaikin et al. | 219/69.15 |
| 5,354,961 | 10/1994 | Diot | 219/61.13 |
| 5,420,388 | * 5/1995 | Girardin | 219/69.15 |
| 5,569,393 | * 10/1996 | Reinhart et al. | 219/69.15 |

FOREIGN PATENT DOCUMENTS 2-121776 * 5/1990 (JP) .

OTHER PUBLICATIONS

Panasonic, MG–ED72W Micro Electro–Discharge Machine'96 Catalogue (2–Pages) Publ. Unknown.
Masaki, "Micro Electro–Discharge Machining Technology", Panasonic, 11/1996 (8 Pages) Publ. Details unknown.

* cited by examiner

Primary Examiner—Geoffrey S. Evans
(74) Attorney, Agent, or Firm—Ronald M. Goldman

(57) ABSTRACT

In a three dimensional generic electric discharge machining (EDM) apparatus the positionable driver assembly (4) houses a discharge electrode (1) that is in the form of a continuous wire, exposing only a predetermined length, the working portion, of that wire for discharge machining. Additional portions of that wire are incrementally advanced (5) from the housing as needed. In one embodiment, that need arises from electrode erosion, and, as an incremental portion of the electrode's working portion is eroded away, an additional increment of wire is advanced from the housing to restore the working portion to the desired length. For automatic control of the working portion's length, a novel sensor (48, 49, 38, 39, 34) monitors the virtual location of the discharge spark that occurs off the tip of the electrode during machining; and a significant shift in position of the spark, indicative of electrode wear, is detected and acted upon by the apparatus (8) to automatically replenish the spent electrode portion. In another embodiment (FIG. 16), wire (75) is automatically advanced (5, FIG. 1) under control of a computer (8, FIG. 1) programmed to predict the progress of workpiece cutting in which the electrode acts as a scoop. The continuous wire, in the form of a flat ribbon, is extruded (65) in increments to form continuous segments of semi-torroidal shape as the ribbon is automatically advanced over a period from the electrode housing for discharge machining that "scoops" material from the workpiece.

38 Claims, 8 Drawing Sheets

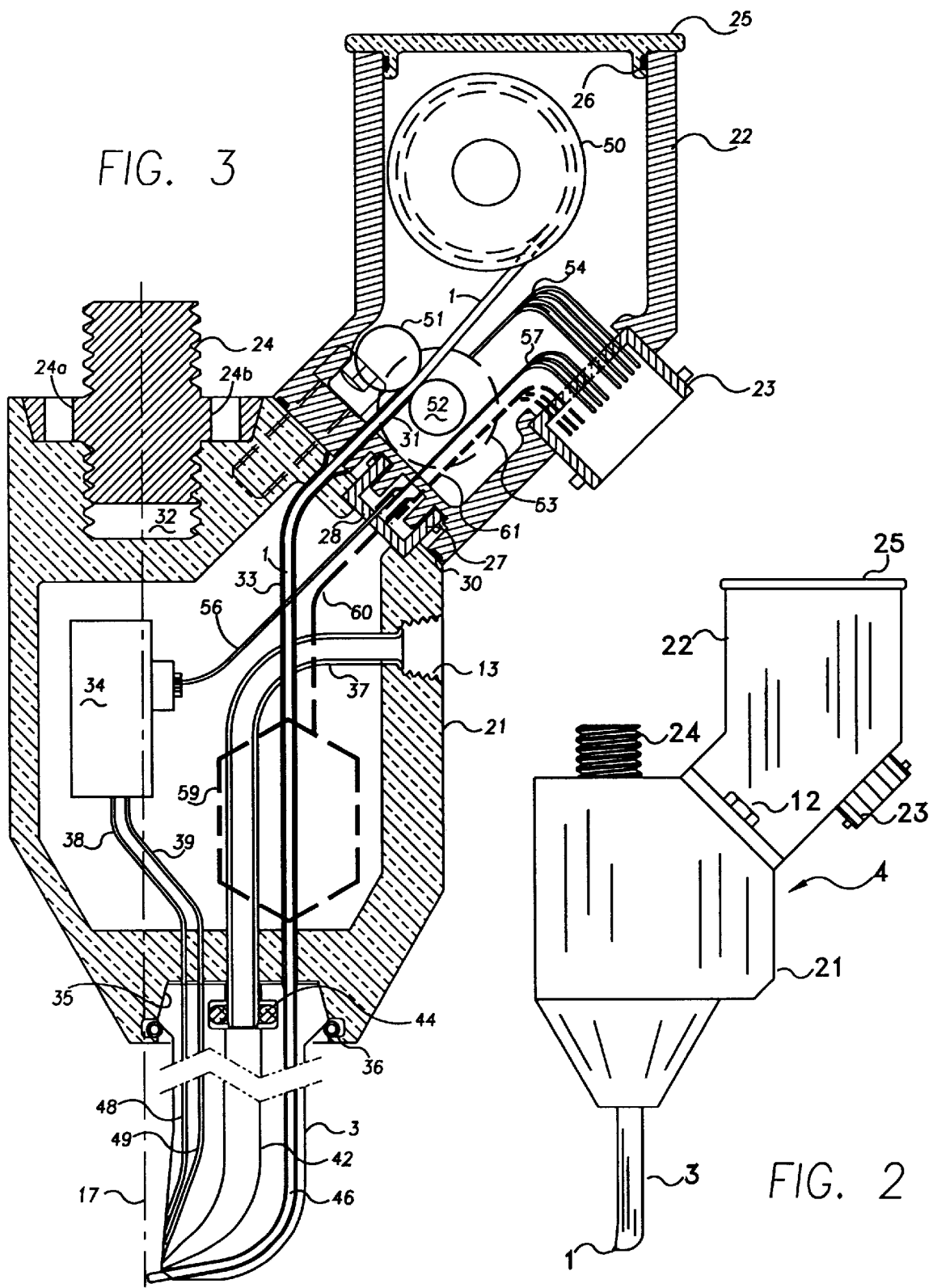

Section B-B

Half-Section C-C

Section A-A

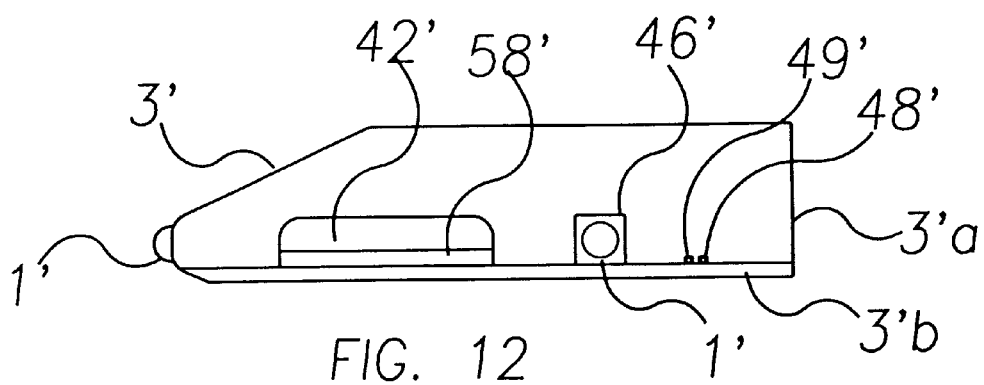
FIG. 12
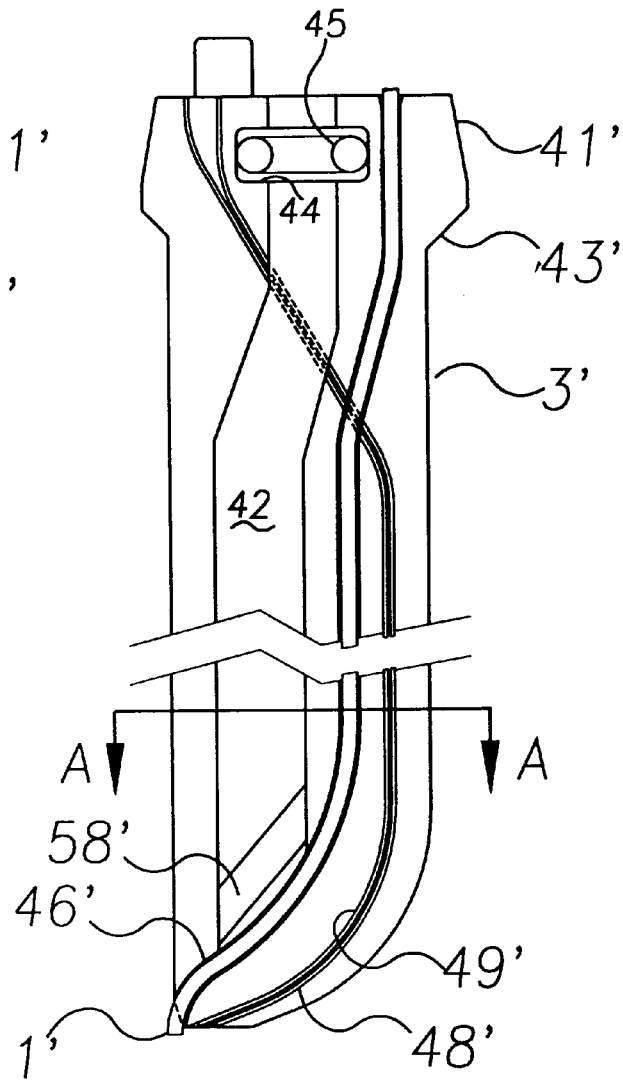
FIG. 11
FIG. 10

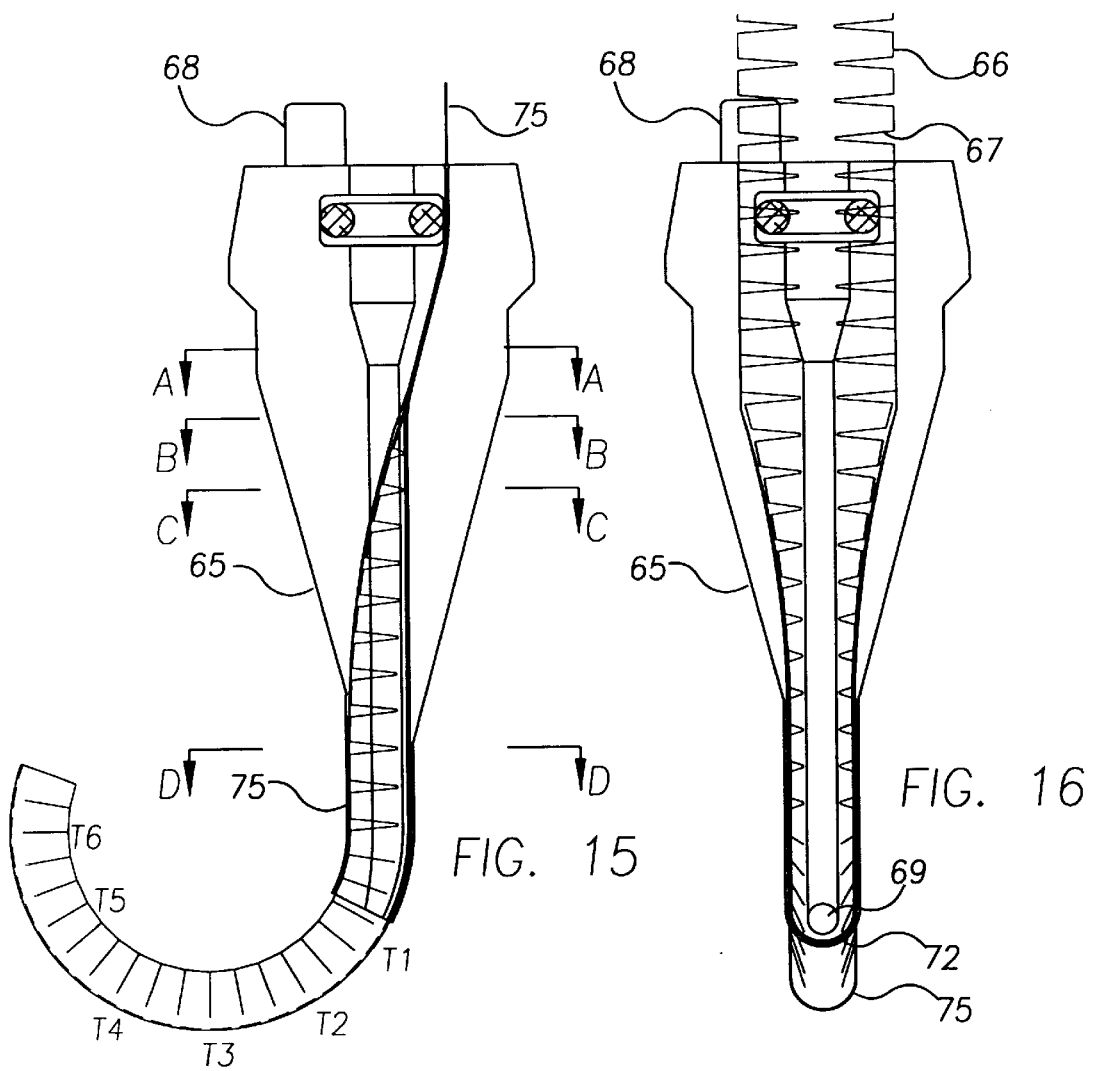
FIG. 15
FIG. 16
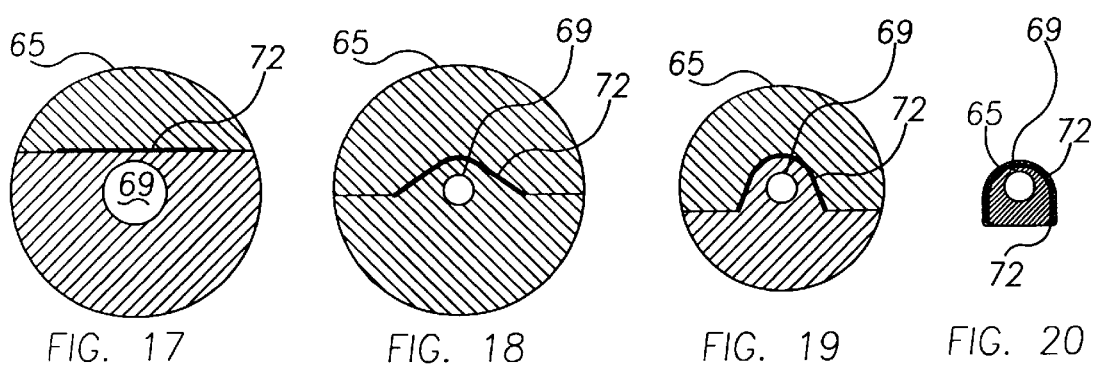
FIG. 17
FIG. 18
FIG. 19
FIG. 20

ELECTRIC DISCHARGE MACHINING APPARATUS

FIELD OF THE INVENTION

The present invention relates to improvements in electric discharge machining (EDM)apparatus, including improved electrodes, and, more particularly, to an improved numerically controlled EDM apparatus for three-dimensionally machining a desired pattern, such as a cavity, in an electrically conductive workpiece with minimal down time. The improvements include a new form of generic electrode for roughing operation that essentially scoops out metal stock from the workpiece; and also a wire electrode that serves as a point source of the sparks to erode the workpiece. The invention further relates to automatic replenishment of spent wire electrode portions to compensate for portions eroded away during machining operation. And the invention relates still further to a novel EDM electrode position sensor and control system that maintains the virtual position of the electric sparks.

BACKGROUND

When a high voltage is applied between two metal pieces separated by a small gap, the voltage difference between the metal pieces stresses the insulating medium situated in the gap. That insulating medium could be a gas, such as the air, or a liquid that is dielectric in character. Should the gap be small, the voltage could be large enough to ionize and electrically break-down the insulating medium, producing an electric arc, or, as variously termed, a spark that jumps across the gap between those opposed surface locations on the metal pieces which, as viewed microscopically, are closest to one another. The spark conducts electrical current from the source of high voltage through the metal.

The electric spark releases energy in various forms, including visible light, ion and electron acceleration, acoustic energy and heat. That released energy, principally believed to be the heat, has an erosive effect on the metals, referred to as electroerosion. Minute amounts of metal sputters from the surface of both metal pieces. Although noting the physical effect of sparks on the metal, the theoretical physics underlying that erosion is not fully understood by the present applicant and, as becomes apparent, is not necessary to the understanding of the present invention.

Because of its erosive effect, electrical sparks have heretofore been used to cut metals, form complex three dimensional cavities within metals and otherwise shape metal surfaces in three dimensions, a process referred to as electric discharge machining (EDM). Apparatus to perform EDM usually employs a shaped metal piece, called the electrode, to electroerode the other metal piece, usually larger in size, the workpiece, which is to be cut and/or shaped. To date EDM has become quite sophisticated. Three types of EDM apparatus are presently used for discharge machining: sinking EDM, numerically controlled three dimensional generic electrode EDM, and wire EDM.

Sinking is the main type of EDM used for making mold parts and other work, where the cut is not composed of straight lines going through the workpiece. In the sinking process, one or more electrodes are prepared to mimic a "positive" image to the "negative" image of the cavity desired. With both the electrode and workpiece immersed in a dielectric "flushing" fluid, the electrode is gradually pushed into the mold material as sparks erode the mold. Debris is flushed out from the spark gap by circulating the flushing fluid.

With sinking, electrode wear is usually an important factor: sharp edges and fine details need sequential roughing and finishing operations with re-surfacing of the electrode in between. However, flushing is the single most important limitation of sinking process speed and accuracy. Since the gap between electrode and workpiece is typically less than 0.005 of an inch and gap areas often exceed one or more square inches, special provisions are often needed to help dielectric (machining) fluid flow through the gap. Regular, frequent stops in cutting action and withdrawal of the electrode from the workpiece to increase the gap and permit a higher rate of fluid flow, are normal functions of existing EDM sinking operations. Material removal rate is very slow, usually less than one cubic inch (1 in$^{3)}$ per hour); electrode preparation is expensive and operator involvement is often required.

Where the size of the workpiece permits, conventional machining, being much faster than sinking EDM, is often used initially to rough out the final shape as a shortcut to speed up the metal removal process. After such pre-machining, the workpiece is often heat treated to its final hardness, and then finished with sinking type EDM.

As an advantage, an aspect of the present invention permits removal of large volumes of metal from a workpiece, expeditiously, much more quickly than by the sinking process, effectively scooping out a chunk of metal at a time from the workpiece, and is particularly useful in working hard or brittle materials, such as carbides, or hard-to-machine work pieces, such as fragile or thin walled shapes and the like.

The numerically controlled three-dimensional EDM process employs a generic electrode, such as a small tube. The term "generic electrode", as accepted in the art, refers to an axial non-formed tool electrode of a simple machining surface contour, which may be cylindrical, triangular or square in cross section and which is generally dissimilar or independent of the three-dimensional shape of a final cavity or contour to be machined in a workpiece. Such a "generic electrode" is distinguished from the formed tool electrode used in the sinking process that is a mirror image or a scaled-down or scaled-up image of the three-dimensional cavity or contour desired in the workpiece.

In the three-dimensional EDM process with at least one generic tool electrode having a machining surface contour at an end portion thereof, the tool electrode is axially juxta-posed with a workpiece to position the machining surface contour in spaced juxtaposition therewith across an EDM gap and the gap is supplied with a machining liquid, a dielectric fluid. A succession of electrical discharges are produced across the EDM gap to electroerosively remove stock from a localized portion of the workpiece. To advance the process, the tool electrode is displaced relative to workpiece the along a three-dimensional path, typically under numerical control, a digital computer, while maintaining the EDM gap, whereby the desired cavity or contour, dissimilar to the generic electrode and basically determined by the path of the three dimensional feed displacement effected between the tool electrode and the workpiece, is carved out in the workpiece. Examples of such numerically controlled EDM apparatus is presented in patents to Inoue, U.S. Pat. No. 4,543,460, granted Sep. 24, 1985, and U.S. Pat. No. 4,606,007, granted Aug. 12, 1986 and in Shimizu, U.S. Pat. No. 4,608,476 granted Aug. 26, 1986.

The advantages of the generic electrode EDM process over the conventional "sinking" EDM process, which makes it essential to use one or more similar formed electrodes of mirror images of a desired cavity or contour, are increasingly recognized in the art. It is very difficult to prepare a formed tool electrode of a precise mirror image of a desired cavity or contour required in the sinking EDM process. In addition, several such electrodes of slightly varying sizes are often required to allow repetition of the process in different modes ranging from roughing to finishing. Because of such factors, the sinking EDM process for machining a three-dimensional cavity or contour has been very costly and laborious.

By contrast, in the three dimensional EDM process a simple tool electrode in the form of a cylinder of small cross-section or the like, or more than one such simple electrode varying in size can simply be employed to machine a large and/or intricate cavity or contour. The cavity or contour is machined in the workpiece by displacing the generic electrode and the workpiece relative to each other, under numerical control or sequence copying control, along a prescribed three-dimensional path programmed in the NC digital computer which determines the final cavity or contour desired in the workpiece. Since the generic electrode is allowed to move generally in an open space to advance machining, the process does not present a problem as the depth into the workpiece increases as is encountered by sinking EDM.

Even with that advantage, the three dimensional numerical control EDM process has not been accepted as a replacement for the sinking process in the manufacture of molds. Because of the large volumes of stock that must be removed from the workpiece to construct the mold, existing three dimensional EDM apparatus is, perhaps, simply too slow. An unavoidable ancillary effect of electric discharge machining is that the generic electrode also erodes, and must be replaced frequently, which contributes to the delay in completing machining. As an advantage, the present invention employs three-dimensional EDM, but does not require frequent electrode replacement. Ideally, EDM apparatus constructed in accordance with the present invention may operate virtually unattended.

Generic electrodes used in 3D EDM apparatus are usually rigid, unlike wire, which is malleable and can be readily bent by hand. One partial exception is a specialized micro-precision EDM equipment developed recently, such as the Panasonic brand model MG-ED 720W EDM apparatus, a miniaturized machine. That miniaturized EDM machine uses a short length of very fine wire as the generic electrode, which is held to an associated mandrel by a ceramic cylindrical member, referred to by the manufacturer as a wire guide. Being so fine, the wire is fragile and if not carefully handled it can of course be bent. Preparation of that electrode wire and the subsequent EDM process is found to be very time consuming. Moreover, that equipment is not a full 3D machine, but may be characterized as a two and one-half dimension one. It handles a two dimensional shape that is "extruded" along the third axis. The lack of compensating mechanism for wear on the micro-fine electrode limits that process to through-holes or slots.

Further the micro-fine wire electrode in that Panasonic apparatus is elongated, and extends, cantilever fashion, a great distance in terms of the wire's radius, from its support. It must be of such a length to machine a passage through the workpiece, as example, and hence must be long enough to extend through the workpiece to the latter's bottom surface. Movement of flushing liquid or high velocity gas used during machining around the fine wire electrode may cause the wire to vibrate or deflect, which compromises machining accuracy. Additionally, when the discharge current passes through that relatively long fine wire electrode during EDM machining, electromagnetic forces generated by that current can also deflect the wire, changing its position. That also compromises machining accuracy. As an advantage, the present invention provides minimum exposure of the electrode wire, only a short length, and thereby avoids the problem of magnetic deflection or flushing fluid deflection to maintain the highest degree of machining accuracy.

Creating a texture or artwork on the inside of a cylinder or cone of a mold using generic electrodes simply has not been practical. And, at present, apart from the present invention, no EDM machine or device known to applicant is able to fully form surfaces on metal work pieces using a the tip of a fine wire. As an advantage, one aspect of the present invention is of a generic electrode that is in the form of a wire, and includes rather fine wires. Using the tip of a fine wire as the electrode, the invention possesses the capability of shaping metal surfaces, including applying texture and artwork thereto, as well as forming through-holes and slots.

Putting aside the foregoing Panasonic miniaturized EDM unit, what is customarily referred to in the industry as a "wire EDM" is an EDM apparatus in which the electrode is wire, such as copper wire typically ranging from 0.006 inches to 0.016 inches in diameter, and that wire is fed from a supply spool located to one side of the work surface onto a take-up spool located on the other side. The wire is under tension and essentially streams past the workpiece, "cutting" the workpiece using only the straight section of the wire that extends between the two spools. The foregoing operation closely mimics sawing with a round jigsaw blade.

The force deflecting the wire in that wire EDM apparatus is mainly generated from the cutting current's electromagnetic effects. Therefore excellent accuracy is obtained if the current is not excessive for the wire diameter used. The effect of electrode (wire) wear on cutting accuracy is kept negligible by feeding a large quantity wire past the cutting surface at a relatively high velocity. It may be noted that a patent to Inoue, U.S. Pat. No. 4,629,855 granted Dec. 16, 1986, suggests use of a flat metal tape or ribbon instead of a cylindrical wire for the foregoing type of EDM system.

Like sawing, the actual volume of metal cut out and removed in the foregoing way is usually many times greater than the volume of metal actually electro-erosively converted into minuscule particles. Therefore, wire EDM is able to produce finished parts relatively fast, even though the slender wire only allows very little "cutting" current to erode the metal.

If the cut does not start on the exterior of the workpiece, it is necessary to first form a starting hole in the workpiece to allow the wire to be threaded through that hole. Fabrication of a starting hole in a workpiece is a sinking operation in which pre-fabricated tubular electrodes are used. For through-holes a cylindrical tube can be used; for blind holes a web is necessary through the inner diameter. The tube is usually rotated during electro-erosion to produce through-holes, which is discretionary, but for blind holes the tube must be rotated and the web removes the standing cylinder of material that an ordinary tube would leave behind. Like wire EDM, the simple tube appears to remove more material than what is eroded. Rotating webbed tubes however requires that all material removed be converted into debris. Modern wire EDM machines function with minimum operator attention, a benefit to that process.

As an advantage the present invention eliminates the necessity for both the sinking EDM and present generic electrode EDM's. It also offers an alternative to, but does not necessarily replace the foregoing wire type EDM. One aspect of the present invention provides a numerically controlled three dimensional EDM apparatus, enhanced with robotic tool substitution apparatus, that is able to efficiently accomplish in a single system the machining accomplished by any of those prior EDM apparatus types.

A common and more specific issue to each of the foregoing EDM systems, and, particularly for wire EDM systems is electrode wear. Not only does the EDM apparatus electro-erode the workpiece, it incidentally erodes the electrode as well, though to a lesser degree. Electrode wear has two adverse effects. If, left uncompensated, electrode wear increases the length of the spark gap. Even with computer controlled compensation to maintain the proper length to the gap, ultimately, the electrode wears down to the point at which the EDM apparatus must be shut down and the worn electrode replaced.

For proper machining operation, the length of the spark gap is important and, desirably, should be maintained essentially constant. Technical data on electrode wear rates is known and, typically, that information is stored in the 3D systems numerical control digital computers. That information is typically used by the computer to make adjustments to the tool assembly to workpiece displacement as a function of the time duration of machining, essentially moving the tool assembly. That supports the electrode, a little more close to the workpiece as a function of time. Thus as the electrode shortens, the computer control automatically corrects for the increasing height of the EDM gap by moving the tool drive assembly and, hence, the electrode, closer to the workpiece.

The foregoing gap adjustment to account for electrode wear is based on prediction, and not actual measurement. An example of such is described in the numerically controlled EDM process presented in the patent to Diot et al., U.S. Pat. No. 5,354,961, granted Oct. 11, 1994. In this predictive technique a metal "wear" calculation is based on preexisting technological data and parameters concerning the tool shape, material, and duration of use; and the numerical control apparatus provides appropriate signals to the three dimensional control unit a signal continuously compensating for such electrode wear. As one appreciates, predictive compensation is more likely to provide a less accurate result than that obtained through actual measurement.

The necessity for compensating for generic electrode wear is also recognized in the Inoue '460 patent, earlier cited. In that patent Inoue suggests inclusion of a gap length monitoring circuit. When the gap exceeds a predetermined length, though insufficient in length to extinguish continued sparking, the monitoring circuit signals the numerical control apparatus, and the latter, in response lowers the drive assembly, carrying the electrode forward, a small amount to place the electrode's tip closer to the workpiece. As an advantage the present invention does not require either the direct measurement of electrode to workpiece as suggested in Inoue '460 or the predictive technique to compensate for electrode wear, but instead insures that the electrode remain of the proper length, despite erosion.

Moreover, with either type of prior art gap length correction technique, a point is eventually reached during machining where the electrode is completely worn down. The EDM apparatus must be shut down and the worn tool replaced, a procedure required all too frequently. Electrode replacement delays machining, and takes the attendant away from other duties. Those skilled in the art appreciate that the efficiency of EDM processing should be improved considerably if the necessity for frequent electrode replacement was eliminated altogether. As a still further advantage, the present invention eliminates such replacements, permitting virtually unattended continuous EDM operation.

Direct or indirect measurement of electrode to workpiece distance in those prior EDM, such as found in the cited Inoue and Shimizu patents, which provide such kind of spark gap control, encourages the cutting tool to follow any surface undulations in the workpiece, disadvantageously repeating those undulations in the cut surface. The effect is to perpetuate a rough surface, instead of obtaining an absolutely smooth surface. As a further advantage the present invention is unaffected by the original condition of the workpiece. Hence, with the present invention a smooth surface may be cut irrespective of surface roughness.

To remove large volumes of material, the sinking EDM process has necessarily been used, despite its difficulty and slowness, and despite the fact that the fabrication of the three dimensional shaped electrodes is expensive and requires considerable lead time. As an advantage another inventive aspect of the present invention permits removal of large volumes of metal without employing sinking or custom shaped electrodes. Advantageously, the present invention also permits chunks of metal to be sequently cut from a workpiece.

Accordingly, a principal object of my invention is to permit three dimensional numerical controlled electric discharge machining apparatus to perform electro-machining virtually unattended.

A further object of my invention is to increase the efficiency of electric discharge machining processes by minimizing the necessity for replacing electrodes due to electrode erosion, minimizing EDM "down time" and minimizing demands for the attendant's attention.

A still further object of my invention is to provide electric discharge machining apparatus with the capability of reserving and storing portions of the cutting electrode and to replenish spent portions of the cutting electrode from the reserved portion.

A related object of my invention is to replenish worn portions of an EDM electrode automatically, essentially without interruption of the electric discharge machining process.

An additional object of my invention is to enable EDM apparatus to form a cavity by "scooping" out chunks of metal from the workpiece, requiring minimal cutting, whereby the desired cavity may be quickly roughed out to approximate dimensions, and then to finish the cavity with great precision, even to engrave the cavity sides with artwork or texture, currently unobtainable without special EDM setups.

A still additional object of my invention is to perform both roughing and finishing operations without using custom made electrodes in a sinking operation, and to perform the foregoing operations under software control, leaving the machining apparatus essentially unattended.

A more specific object of the invention is to provide a new form of wire electrode that employs the tip end of wire for generation of EDM sparks, whereby the wire's tip may be applied as a point source of sparks to three dimensional shaping of metal surfaces.

An ancillary object of the invention is to minimize wire electrode deflection during machining arising from electromagnetic influences or other external forces.

Another more specific object of the invention is to provide a new form of EDM electrode and accompanying means for moving that electrode to produce a scooping action during electric discharge machining, whereby metal chunks are scooped from a workpiece.

And a still additional object of the invention is to enable direct monitoring and maintaining of the spatial position of the sparks occurring in the EDM gap during the electro-erosion process, eliminating effects of electrode wear and the need to monitor EDM gap length.

SUMMARY OF THE INVENTION

In accordance with the foregoing objects and advantages, the multi-faceted invention encompasses two totally new concepts for "active" EDM electrode tool holders, tool housing or tool assemblies, as variously termed, one for roughing and another for finishing. The tool assemblies include, as variously termed, a tool or electrode guide that extrude and/or form simple disposable electrodes to generate any shape cavity. The electrodes for roughing are in the form of a metal ribbon, preferably notched along the side edges, and, for finishing, are of the form of solid wire. Both electrodes cut with their small end surfaces. The electrodes are greater in length than the short working length required for electric discharge machining, providing a reserved electrode portion that is stored in the tool housing and in the electrode guide, behind the front end of the tool assembly where electroerosive cutting takes place. The tool housing further includes a feed mechanism that advances the electrode relative to the tool housing and electrode guide. The electrode is fed through the electrode guide under computer control, whereby additional portions of electrode may be extended from the front of the guide as needed.

In accordance with a roughing aspect of the EDM invention, a flat or coiled ribbon electrode is transformed into an arcuate torroidal shape or, as variously termed, curl as it is gradually fed and extruded through the tool holder to electroerosively scoop out chunks of stock from the workpiece. The spark gap is U-shaped. A variety of radii may be selected for the extruded ribbon, ranging from a single large radius connecting straight legs of the formed U-shape cross section to a near rectangular U shape. Simultaneously with the sparking, high pressure dielectric fluid is fed through the holder to flush away resultant debris. Being of a small area, the small area electrode allows good flushing across the cutting gap, allowing greater percentage of cutting time. With direct filtration, and controlling the temperature of the dielectric fluid fed directly to the cutting gap allows optimum cutting efficiency and work surface finish.

Almost all cutting action takes place on the end surface of the ribbon. For this roughing tool the cutting location is calculated by the NC computer control apparatus on predicted wear rate based upon the ribbon and workpiece materials and electrical parameters. The ribbon is thereby incrementally advanced. Behind the guide orifice from which the ribbon emerges, the tool is curved in a plane perpendicular to the curve of the orifice, and ultimately extends over a wide arc. This cross-curved geometry gives strength and geometrical stability to even very thin foil ribbons. As the ribbon emerges from the surface it entered, it cuts out a piece of solid material resembling a piece of a donut.

The foregoing roughing is essentially an "open loop" (like conventional sinking EDM) type positioning for the ribbon end. In accordance with a more specific aspect of the invention, the EDM system includes a ribbon trimming apparatus. Each time the ribbon extends to its full arc, completing a scoop, the tool holder carrying the ribbon electrode and the severed chunk of workpiece is withdrawn from the workpiece and positioned at the ribbon trimming apparatus to be accurately trimmed off. Repositioned back at the workpiece, the additional lengths of ribbon electrode are then again fed out from the holder by the accurate feeding mechanism to resume the scoop-like cutting procedure, and remove another scoop.

In accordance with the finishing aspect of the invention, the finishing tool is a slender wire guide with the wire orifice at the outer surface of the tool guide from which a wire electrode emerges. In one specific embodiment the electrode wire emerges at an angle from the tool guide, extending laterally to the side; in another the wire extends straight. In practice the wire end and the working length of the wire, that is, the length exposed, is only one to six wire diameters beyond the orifice, while reserved portions remain inside in the metal wire guide. Hence, the current carrying capacity of the wire is far greater than in conventional wire EDM for a given wire diameter, and, because the working length is so short, the wire end resists externally induced deflection and/or vibration for enhanced machining accuracy. Through a passage in the tool that opens surrounding the wire, high pressure flushing liquid (electrolyte) is expressed from the wire holder, aiding debris removal and helping to cool the wire.

As an additional feature, the finishing wire electrode holders contain sensors, such as fine optical fibers or miniature pressure transducers, to detect and monitor the exact location of the spark gap at the wire's end. The sensor is combined with a form of closed loop servo control of electrode replenishment for machining accuracy. Controlled by the NC digital computer, wire feed is essentially servoed to keep the spark in the "focal point" of the optical or acoustic detectors around the orifice. By controlling the wire curvature and precisely guiding it near the orifice, cutting accuracy of this "single point" tool therefore can be in the 1/10,000th inch range, or even better, depending mainly on the accuracy of the particular tool positioning system employed. This feature permits the EDM to automatically dispense reserved electrode portions to replenish any portion lost through electro-erosion, ensuring that the electrode is essentially always of the correct length and is properly positioned during machining.

The foregoing and additional features, objects and advantages of the invention together with the structure characteristic thereof, which was only briefly summarized in the foregoing passages, becomes more apparent to those skilled in the art upon reading the detailed description of the preferred embodiments, which follow in this specification, taken together with the illustration thereof presented in the accompanying drawings.

BRIEF DESCRIPTION OF THE DRAWINGS

In the drawings:

FIG. 2 is a side view of a practical embodiment of a tool constructed in accordance with the invention used in the EDM apparatus of FIG. 1;

FIG. 3 is a partial section view of the tool of FIG. 2;

FIG. 10 is an enlarged section view of an alternative guide component used in the practical embodiment of FIG. 3, which may be used as an alternative to the guide of FIG. 6;

FIG. 11 illustrates the guide component of FIG. 10 in side view;

FIG. 12 is a section of FIG. 10 taken along the lines A—A;

FIG. 15 is another view of the scoop forming guide shown in FIG. 13 but with the notched ribbon electrode in place;

FIG. 16 is another view of the scoop forming guide shown in FIG. 14 but with the notched ribbon electrode in place;

FIGS. 17 through 20 are cross section views of the scoop forming guide of FIG. 15 taken along the respective section lines A—A through D—D in FIG. 15.

DESCRIPTION OF THE PREFERRED EMBODIMENTS

Figure 1:
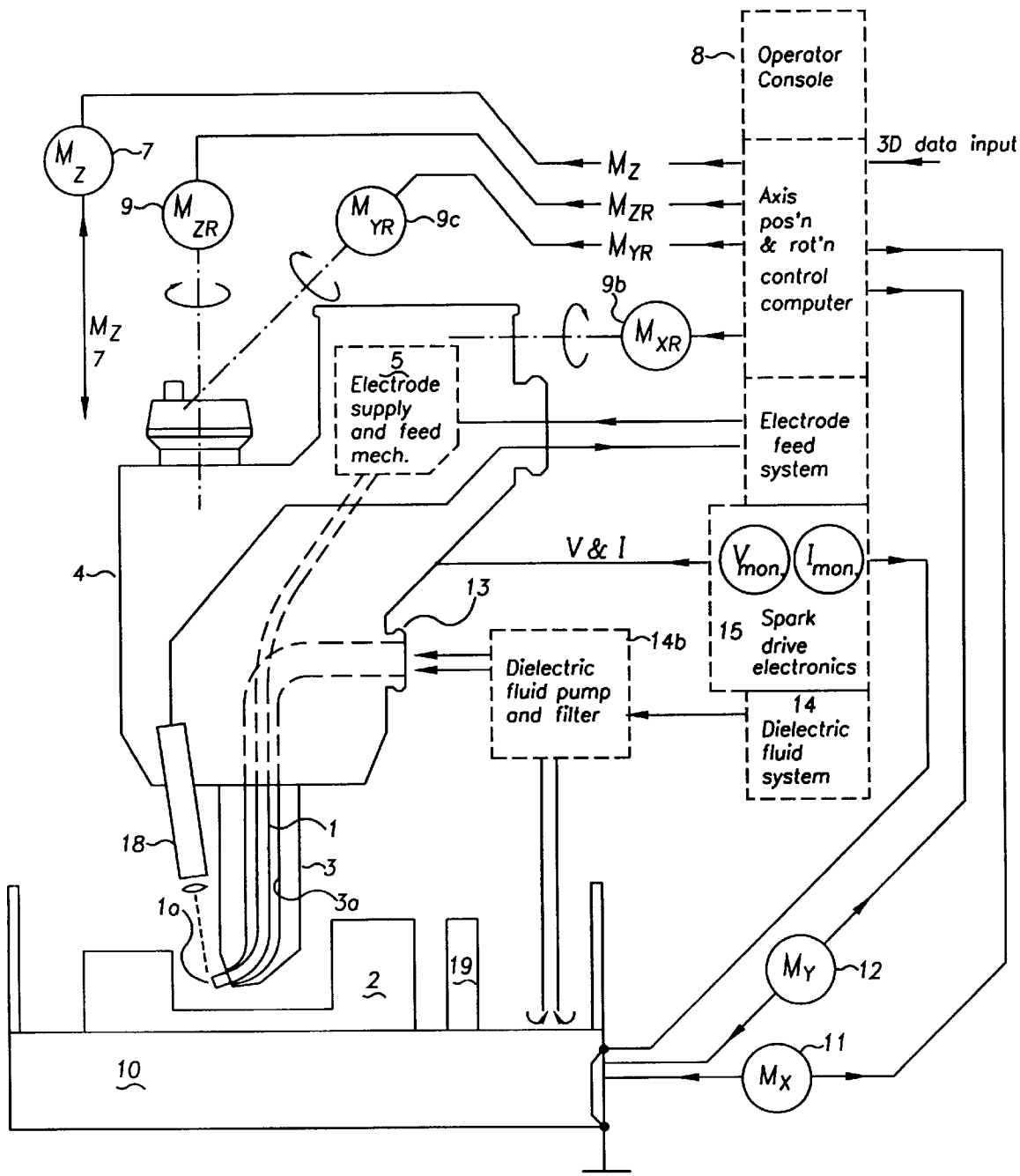
FIG. 1 is a pictorial illustration of an embodiment of an EDM system containing an embodiment of the invention.

Referring now to FIG. 1 there is partially pictorially and diagrammatically illustrated an EDM apparatus containing an electrode 1, tool drive assembly containing tool housing 4 to carry the electrode, a numerical control (NC) apparatus 8 for tool axis control and positioning, including the main control operator console therefor through which operator information is input to the NC apparatus digital computer, and a positionable work table 10. The main control also controls a dielectric (machining) fluid system 14 and spark drive electronics 15. Unique to my invention, tool housing 4 carries a feed mechanism 5 that is controlled by NC apparatus 8, and an electrode 1 that is formed of wire. The end of that electrode serves as a point source of the erosive sparks and the electrode includes a "reserved" portion, which is unique in this art, extending through the tool housing. It also contains a unique guide member 3 for that electrode, and a spark monitoring device 18, all of which is described hereinafter at greater length. The EDM apparatus is illustrated as operating upon a work piece 2, affixed to work table 10.

Electrode 1 is a wire electrode, preferably, a solid metal filament or, as variously termed, a wire, whose end surface is flat and circular. Other cross section shapes may of course be substituted as desired. Suitably the wire is formed of copper or other conductive metal or metal alloy and is sufficiently malleable or ductile in characteristic as would permit one to bend it by hand, or wind it up on a spool. The active machining area is the wire's end surface 1a, the cross section. As those skilled in the art will recognize, the wire electrode is classifiable as a generic electrode 1, i.e. a tool electrode having a machining surface contour 1a which is of a configuration generally independent of the shape of a desired pattern, such as a cavity or contour, to be carved into workpiece 2. The area of the active machining surface contour 1a of the electrode 1 is much smaller than the total contour of the pattern to be machined in the workpiece. Such an electrode is usually used in a "finishing" type machining operation and not a "roughing out" type machining operation.

For purposes of illustration, wire electrode 1 is shown protruding from an orifice in the end of a guide member 3 and is bent or curved about so that its end or tip 1a is directed almost horizontally, facing sideways, confronting a side wall of a cavity being formed within workpiece 2 and spaced from that side wall by a small gap, sometimes referred to as the EDM gap, illustrated greatly exaggerated in length, through which the erosive sparks jump during EDM operation. It should be recognized that, and, as later herein described, alternatively, with a different guide member, electrode 1 could be one that instead extends vertically straight down.

Electrode 1 is axially displaceable in the vertical direction or the direction of a Z-axis by tool housing 4, which together with the guide member and electrode are often referred to in current parlance collectively simply as the tool or tool drive assembly. Unique to the present invention, tool housing 4 carries a guide member 3, and electrode 1 extends through an internal guide channel in that guide member. In accordance with an important feature of the invention, the electrode is also axially displaceable relative to guide member 3 by the feed assembly 5, a positioning or advancing mechanism, that is located within tool housing 4, whereby the electrode's tip may be moved farther out the guide or, conversely, be retracted there into.

The relative position of tool housing 4 is controlled, for one, by a servo-motor (Mz), 7, which is supplied from numerical control unit 8 with command drive signals (pulses) to initially set and control the vertical position of the electrode's active machining contour 1a and controls the feed displacement thereof in the direction of depth into workpiece 2 in accordance with the contour or shape prescribed by the numerical control apparatus. The tool housing may, optionally, also be controlled by another servo-motor (Mzr) 9A, also similarly controlled by other command drive signals from numerical control unit 8 to set the rotational position of the housing about its longitudinal z-axis, defining a four axis control system. An optional six axis control system also includes additional servo-motor (Mxr) 9B, to set the rotational position of the tool housing about its x-axis and motor (Myr) 9C, to set the rotational position about the y-axis, essentially tilting the tool housing as appropriate about the respective x and y axes. Both of servo-motors 9B and 9C are similarly controlled by other command drive signals from numerical control unit 8.

The workpiece 2 is securely mounted on a worktable 10 in a cross-feed configuration which is driven by a pair of servo-motors 11 and 12 supplied with command drive signals (pulses) from the NC unit 8. The motor 11 is driven to displace the workpiece 2 in the direction of an X-axis and the motor 12 to displace the workpiece 2 in the direction of a Y-axis in an X-Y or horizontal plane. As those skilled in the NC EDM art appreciate, although the NC system of FIG. 1 employs an x-y axis positionable work table, an equivalent alternative system, is for the work table to remain fixed in position and have the x and y axis servo-motors applied to also position tool housing 4 along the x and y axes, which is a more customary arrangement. Both such arrangements are entirely conventional with the latter being preferred by most.

The NC apparatus 8 contains, among its stored data and programs, a set of programmed data stored therein which defines a path of relative three-dimensional feed displacement between the active machining contour 1a and the workpiece 2 that is prescribed to determine the shape of a cavity to be carved out by electro-erosion in the workpiece 2, which is conventional in the EDM art.

An electro-erosion medium or machining liquid is supplied under pressure into the EDM gap from a dielectric fluid system 14 and its fluid pump 14b through an inlet pipe 13 and the internal channel 3a in guide member 3. Typically, the workpiece 2 is received in a worktank (not shown), and the latter is securely mounted on the worktable 10 and filled with the machining liquid so as to completely immerse the workpiece 2 deep therein, although the workpiece 2 may be only partially immersed or free from immersion especially where the machining liquid used is an inflammable fluid such as distilled water. The machining liquid in the worktank is drained and, upon purification, recycled through pump 14b back into the inlet 13.

The electroerosion is performed by a EDM power supply of conventional design, which is shown as block 15 labeled spark drive electronics. The positive and negative power supply outputs are connected, through housing 4 and guide 3, between tool electrode 1 and, through table 10, to the workpiece 2, placing the voltage generated by the power supply across the EDM gap. One polarity terminal of the spark drive electronics and work table 10 are customarily electrically grounded.

During operation, following initial calibration later herein described, under the commands of the NC apparatus 8, a succession of voltage pulses are applied between tool electrode 1 and the workpiece 2 and may cause discrete, time-spaced or intermittent electrical discharges across the EDM gap formed between the active electrode contour 1a and the workpiece 2 to electroerosively remove stock from the workpiece 2. The stock removal action is accompanied by the formation of machining or erosion products, e.g. chips and gases, which tend, in the arrangement described, to be removed rather quickly from the EDM gap, thus keeping the latter region substantially purified and practically free from these contaminants.

Additionally, in conventional practice, the NC apparatus 8 may have the additional function of intermittently retracting the tool housing and, hence, electrode 1, away from workpiece 2 at predetermined machining intervals by energizing the motors 7, 9 and/or 11, as appropriate, to move the tool away from the workpiece temporarily.

Feed assembly 5 functions to advance (or retract as appropriate) the electrode in position, and is suitably controlled by the NC apparatus 8. Further, the NC apparatus functions in conjunction with a spark position monitor 18, another feature of the present invention.

Spark position monitor 18, unique to the present invention, monitors the position of the spark that appears at the end of the electrode during EDM machining operation and supplies that information to NC apparatus 8. In turn, the NC apparatus provides commands to operate the feed mechanism 5 and, as may be found necessary, advance the electrode forward. In this way the length of the portion of electrode 1 that protrudes from the guide 3 is maintained substantially constant to compensate for any electro-erosive wear of the electrode. In alternative embodiments the spark position monitor 18 and the feed mechanism 5 may be arranged in a servo-loop circuit so that the former monitor initiates operation of feed mechanism 5 directly without requiring intervention of NC apparatus 8.

It is appreciated that the foregoing EDM system incorporates both the conventional aspects of the prior numerically controlled 3D EDM systems and the new elements and functions characteristic of the invention, that were only briefly described, but which are next considered in greater detail. The foregoing elements of the tool, namely tool housing 4, guide member 3, electrode 1, spark monitor 18 and feed apparatus 5, are readily implemented in a practical embodiment. FIGS. 2 and 3, to which reference is made presents a pictorial view of a practical embodiment of tool housing 4, guide member 3, electrode 1 and associated elements used in a "finishing" tool assembly.

Referring to FIG. 2, drive assembly 4, includes a separable housing 21 and feed module 22, attached together in a mechanically streamlined design. The guide member 3, which guides wire electrode 1 from the drive assembly, is of a plug-in design, and plugs into a socket formed on the underside of housing 21. The housing 21, feed module 22 and guide 3 are constructed of a strong electrically conductive rigid material, preferably steel. Guide 3 is relatively long and slender, permitting the guide to reach deep within cavities, avoiding the necessity of exposing more than a very small portion of electrode 1, which is unique to the invention.

The outer shell of a connector 23, which electrically connects the unit to an electrical cable from the electronic NC control apparatus 8, earlier described, is partially visible in this view and extends from the side of the feed module. A threaded adaptor 24 is attached to the top of housing 21. The adapter mechanically couples to the NC quill, the NC apparatus's positionable arm, not illustrated, which carries and positions the tool drive assembly 4 in accordance with the coordinate positioning motors described in FIG. 1. Although not illustrated in FIG. 1, it is understood that a quill is implicit in the NC EDM apparatus 8 of FIG. 1.

Referring to the section view of FIG. 3, the feed module 22 is constructed with an open upper end. That open end is closed by a conforming lid 25, that is held firmly in place by the compressive fit of O-ring 26. A bottom wall of feed module 22 contains an electrical connector 27, outwardly extending from that wall. That connector plugs into a mating electrical connector 28 in an upper wall of tool housing 21. As better illustrated in FIG. 2, the feed module is secured to housing 21, suitably by a bolt 12 or other conventional fastening means, which extends through a bolt passage in a side flange into a threaded bolt hole in a side flange to housing 21. Returning to FIG. 3, an O-ring 30 positioned within a peripheral groove in the side wall of the feed module 22 provides a seal between the housing 21 and the feed module. A cylindrical metal conduit 31 supported in that bottom wall serves as a wire passage or guide that leads into a corresponding aligned conduit 33 in the housing's upper wall, later herein described.

The housing's lower end contains a female quick disconnect end portion 35, a conical shaped opening surrounded by a radially extending groove that seats a firm garter spring 36 or other conventional quick disconnect fastener, which seats and holds guide member 3; and a pair of guide holes, not illustrated. As better illustrated in the enlarged section view of the guide member 3 in FIG. 6 and the top view thereof in FIG. 9 to which brief reference is made, the upper end of the guide contains two vertically directed cylindrical guide pins 40 and a conically tapered portion 41 that drops off toward the guides axis at a predetermined position behind the guide end forming an inwardly directed rim 43.

Returning to FIG. 3, it is seen that when inserted into housing 21, guide member 3 must be properly angularly oriented so that guide pins 40 enters the guide hole in the housing. When so oriented, by pushing the guide 3 upwardly, garter spring 36 temporarily expands radially further into its supporting groove as guide member 3 is vertically moved into place, and then contracts to its normal diameter, engaging guide rim 43 to hold the guide member in place in the tool housing.

Adapter 24 is threaded and is screwed into place within a mating threaded hole 32 in the upper end of the tool housing. Adaptor 24 preferably includes wrench receivers 24a and 24b used for tightening the adapter in place.

It should be appreciated that the foregoing adapter structure presented is solely for illustration. As those skilled in the art recognize, such coupling adapters are not standardized in the EDM industry. Some EDM's use straight, that is, cylindrical collets, others use tapered collets. Screw thread mounted tool holders, such as adapter 24, are often made for specific jobs and/or electrode shapes. Thus it is understood that the invention is not limited to the particular details of adapter 24 and that other known adapters may be substituted therefore in the tool housing without departing from the invention. Additionally, it should be recognized also that tool housing 21 could alternatively be configured with a permanent end portion configured for attachment to any chosen tool holder, such as those found on EDM machines currently known in the art.

Feed module 22 houses a spool or reel 50, a pinch roller 51 and a drive capstan 52. The reel 50 and the pinch roller 51 are rotatably mounted to the module walls on respective brackets, not illustrated. The malleable wire electrode 1 is provided in a large, almost indeterminate length and, as earlier described, since only a small portion of the length is being used in traversing the distance through the housing and guide 3, the reserved portion of that length is stored, wound up on reel 50. As later herein described, the reel thus serves as a convenient electrode reservoir from which to replenish spent portions of the electrode.

The drive capstan 52 is attached to the shaft, not illustrated, of an electric motor 53 mounted in the interior of the feed module, suitably a bi-directional stepping motor. The stepping motor drives the capstan, a step at a time, incrementally, each time it is electrically energized by the numerical control apparatus 8. The inputs of the stepper motor 53 are connected via a multiple electrical leads in cable 54 and are attached to respective electrical contacts in electrical connector 23 by which the stepper is connected to driver circuits in the NC apparatus. Although the stepper motor is illustrated as containing more than two electrical leads, other equivalent stepper motors which may be substituted, may contain a lesser or greater number of electrical leads. Substituting an electric motor that requires greater number of electrical leads requires employing a greater number of contact pins in the associated electrical connectors illustrated, and those which require but two leads, would permit some contact pins to remain unconnected.

Stepping motor 53 is capable of producing minute feeding increments in the micron range so as to advance, or, as later herein described, retract, the wire electrode through guide 3, when required, by one or two microns at a time. A conventional DC servo motor with a resolver, a piezoelectric type or any equivalent motor mechanism that produces incremental movement or positioning in accordance with the operation described herein may be used.

As those skilled in the art also appreciate, other electrically controlled feed mechanisms may be substituted for the foregoing stepping motor and capstan arrangement. As example, one alternative is a piezo-electric feed mechanism, which comprises two piezo-electric actuators, that when actuated extend, grip the wire electrode 1 between them and feed the wire a small step in the desired direction, and restore, awaiting further actuation. Such feed mechanisms are well known in the art.

A wire electrode guide or conduit 33 is housed in housing 21. That conduit contains a flared upper end and is supported by the housing walls. It extends from the upper end of the housing 21 through a passage in the housing's lower end and, thence into and through an aligned conduit 46 that extends through guide member 3. The flared upper end is aligned with the output end of wire guide conduit 31 through which wire electrode 1 is routed from feed module 22.

The tool housing 21 encloses an optoelectronics circuit 34, a flushing liquid conduit 37 and, optionally, a wire twisting module 59, later herein more fully described.

Initially, to prepare for machining operation, the end of the wire electrode is drawn off reel 50 and manually fed between capstan 51 and pinch roller 52. Then by operating stepping motor 53 a number of times during the start up procedure the wire is fed into wire guide 31, and thence into the flared end portion of the mating wire conduit 33 in the lower end of housing 21, which guides the electrode into a corresponding guide passage 46 through guide 3, and allows the wire end to protrude out the guide orifice. When ready for electro-erosion processing, the wire electrode, thus extends from reel 50, through feed assembly 22, housing 21 and guide member 3, and protrudes slightly, preferably about the distance of two electrode wire diameters, from the guide member's end and to the left in the figure. That protruding length is sometimes referred to herein as the electrode's working length.

The length of wire electrode 1 protruding from the guide orifice may be initially set in any conventional way, such as with the drive assembly 4 located in a known reference position in the EDM machine proximal to an electrically grounded permanent reference point in the work area. However, the preferred embodiment of the tool assembly incorporates the novel optical monitor and control system for controlling that protrusion, later herein more fully described, which includes optoelectronics circuit 34 and two light pipes formed of optic fibers 38, 39, 48 and 49. That optical monitor and control system is used to maintain the amount of wire electrode's protrusion or working length, as variously termed, and is described more fully in connection with the discussion of the operation of that system later herein and its initial calibration.

For flushing, a flushing liquid conduit 37 extends from pipe fitting 13 through the bottom of housing 21 and protrudes a short distance into the housing's quick-disconnect end portion 35. There the conduit connects to an end of the flushing channel 42 in guide member 3. Returning again briefly to FIG. 6, guide 3 includes a fluid passage 42, extending from the top to the bottom end, where the passage curves off the vertical axis. Passage 42 extends to the left side of the guide member and is constricted in diameter. And the outlet orifice to that passage is located adjacent electrode wire 1. A radial groove 44 in that passage's cylindrical side wall near the passages inlet end seats another O-ring 45. When guide member 3 is inserted into the housing, the protruding portion of conduit 37 protrudes into passage 42 and is sealed by that O-ring. Returning to FIG. 3, pipe fitting 13 is preferably a threaded female fitting located through any convenient location on the housing 21 and is to be connected with appropriate piping to the dielectric flushing fluid supply 14, earlier pictorially illustrated in FIG. 1. Also a quick-connect fluid fitting may be inserted in pipe fitting 13.

Figure 6:
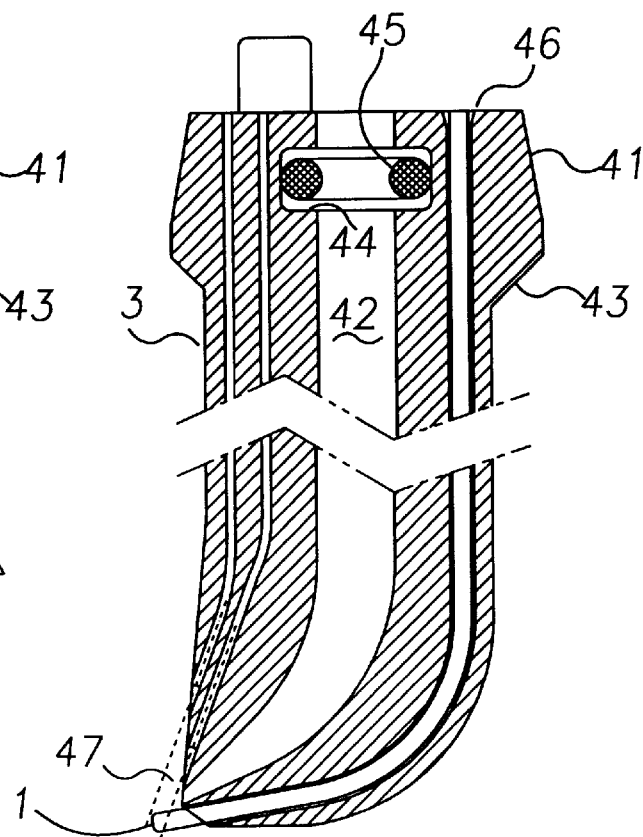
FIG. 6 is an enlarged section view of the tool guide component used in the practical embodiment of FIG. 3.

Turning again briefly to the enlarged section view of the guide in FIG. 6, it is seen that flushing channel 42 extends in a curve to an orifice at the guide's bottom end, providing an exit for the flushing fluid. That orifice is located immediately next to the electrode conduit 46, through which electrode 1 protrudes. Flushing channel 42 gradually reduces in diameter to a minimum diameter at the channel outlet or orifice, as variously termed. The effect of the constriction is to increase the velocity of the flushing fluid during operation as the fluid flows out the orifice. Moreover, the expressed flushing fluid is directed to the distal end of the electrode, the region at which the electric sparking occurs, during electro-machining operation. That permits the flushing fluid to thermally conduct away much, if not all, of the heat created in the electrode by the energy of the sparks as well as any ohmic ($I^2R$) heat generated by the current flowing through the wire electrode. That cooling thus allows the use of higher energy sparks, that is, a higher current, than otherwise for the electro-erosion of the workpiece, permitting the EDM to more rapidly electro-erode the workpiece.

Automatic positioning of the electrode's end surface 1a is accomplished by monitoring the position of the spark formed at that surface, accomplished by viewing light produced by the spark from two different positions. Thus housing 21 includes an optoelectronics device 34 and a pair of light conducting pipes, fiber optic members 38, and 39. The output end of those fiber optic members are connected to a pair of the optoelectronic device's inputs. The other ends of those fiber optics respectively optically coupled to fiber optic members 48 and 49 located in passages in guide member 3 and forms therewith a pair of optical transmission lines or, as variously termed, light pipes.

It should be recognized that even though the fiber optics in each light transmission line are in separate sections they are coupled together end to end, serially, to essentially form a single or continuous optical line or light pipe. Alternatively, one may include conventional optical connectors to connect the ends of the serially extending light pipes together. Further, it is appreciated that the term fiber optic member refers to a single solid fiber optic strand; and that, if desired, fiber optic cables, containing multiple strands of fiber, may instead be substituted to serve that light coupling function.

Optoelectronics device 34 converts the intensity of the light, an analog signal, received through each of optical fibers 38 and 39 into a pair of digital output signals, suitably a series of digital pulses. The optoelectronics device is of any conventional design. The digital output of optoelectronics device 34 is connected via electrical cable 56, interconnecting connectors 28 and 27, electrical cable 57 through feed module 22 to contacts of output connector 23, from which the two outputs are coupled to an input of NC computer 8, not illustrated in the figure, for comparison and processing.

Figure 4:
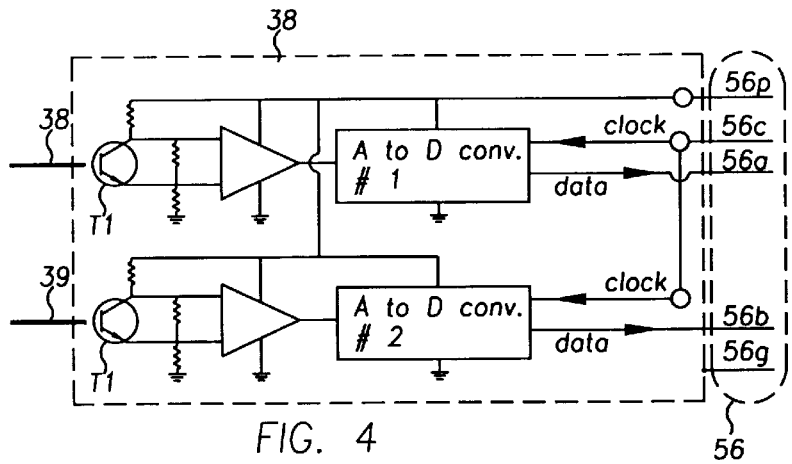
FIG. 4 is a block diagram of the optoelectronic circuit used in the tool of FIG. 3.

Internally optoelectronics device 34 includes a pair of identical optoelectronics circuits, each of which is associated with a respective one of the two light pipes 38 and 39. Reference is made to FIG. 4, illustrating the pair of optoelectronics circuits A and B, one of which A, taken as representative, is further illustrated in block diagram form. The optoelectronics circuit includes an optical detector T1, such as a phototransistor, for the associated optic fiber 38 in FIG. 3. The photo detector converts the light to an electrical voltage, with the level of that voltage being proportional to the intensity of the light.

The output of that photodetector may be amplified if found necessary with a damped DC amplifier T2, such as an operational amplifier, and the output of that amplifier, an analog signal, is coupled to the analog input of an analog to digital (A/D) converter T3, which also may be slow to react or, as variously termed, damped. If the output voltage obtained from the photo detector T1 selected is sufficient, the photodetector may be coupled directly to the A/D converter, eliminating amplifier T2.

The NC apparatus 8 of FIG. 1 supplies voltage and ground over leads 56a and 56b to supply electrical power to the circuits. The output from A/D converter T3 is placed on data lead 56c, and that from the A/D converter, not illustrated, in the other optoelectronic circuit is placed on data lead 56c. The enable or strobe signal from the NC computer that initiates the output of the A/D converters is applied via lead 56d. The latter lead is also paralleled to the enable input of the other A/D converter to minimize the number of electrical leads. Even though that results in simultaneous readout of both A/D converters, the computer permits reception of the digital data from only the selected one of the circuits at any one time. The foregoing leads are formed within electrical cable 56, shown in FIG. 3, and the associated connectors.

When enabled by an enable or strobe signal from the NC computer, analog to digital (A/D) converter T3 converts the analog DC signal to a series of digital voltage pulses, which are output, on command, to the NC computer via lead 56c. The NC apparatus computer receives and counts such pulses from that lead and uses that count as representative of received light intensity.

Circuit elements of the foregoing type are described in the technical literature, as example, in the Encyclopedia of Integrated Circuits, $2^{nd}$ Edition, Buchsbaum, Prentis Hall, copyright 1987 and in the AIP Handbook of Modern Sensors, Fraden, American Institute of Physics, Copyright 1993. Such components, individually or collectively, can be obtained from semiconductor device vendors, such as Omega company.

The optoelectronic circuits should be slow-to-react or, as otherwise stated, be damped to avoid reacting to transients of short duration. As example, should specks of material being carried away in the dielectric flushing fluid pass in front of one of the light pipes at the end of guide 3 (in FIG. 3), the specks will briefly shade the input end of a light pipe. That shading will be detected by the photodetector, which produces a decreasing voltage spike. The circuit damping, such as with a capacitance, absorbs such spikes, allowing only the average signal level to pass. In that way the A/D converter is prevented from issuing false digital signals to the NC computer.

The NC apparatus computer is programmed to make the comparison of the two values obtained, as later herein described in greater detail. Since both halves of the optoelectronic circuit are subject to the same ambient temperature, they are similarly affected by temperature changes. However since a ratio is being taken between the two values obtained, the effect of temperature drift is believed to be minimal, and should not require the use of highly temperature stable components.

As those skilled in the art appreciate other circuit elements may be used. As example, a A/D converter whose output is a multi-bit parallel code may be used instead of the serial digital form described. However, because a multi-bit data code requires multiple leads to convey the information to the NC computer, and that in turn requires a like number of additional connector contacts on connector 23. Because more connector contacts are required, should one contact corrode, false information would be supplied to the NC computer. That is believed to be less reliable, and, hence, less preferred than the serial digital form.

Preferably the optoelectronic device 34 is encased or potted with epoxy, as outlined in dash lines, to protect the circuit elements from the flushing fluid and other external contaminants as might cause damage or interfere with the circuits operation.

Reference is again made to the enlarged view of guide 3 in FIG. 6. As shown, the axis of cylindrical wire electrode 1 extends to the left in the figure at a slight angle to the horizontal. The axes of the two fiber optics 48 and 49 extend in parallel from the left side of the guide with the axis of fiber optic 49 intersecting the electrode axis at a position slightly behind its tip end 1a. The axis of fiber optic 48 is oriented to intersect the electrode axis at a position slightly in front of the electrodes end surface 1a. Essentially the fiber optics are spatially separated and receive light at two different spatial positions. Since the latter is closer to the position at which the spark is generated, fiber optic 48 should normally receive a greater amount of light than the other fiber optic.

As the metal is eroded away from the electrode during operation of the EDM apparatus, the tip surface 1a recedes in position, moving closer to guide member 3. Hence, the spark moves accordingly closer to guide 3. Although the amount of light into the leftmost fiber optic may thereby decrease slightly, the amount of light propagating into the right fiber optic increases significantly.

During the electroerosion process, the computer NC EDM directly moves the tool drive assembly 4 in the z or vertical axis direction while controlling the motorized x-y table motion in accordance with the NC apparatus computer 8's process control program. The succession of current pulses needed for the electroerosion process is typically supplied by the EDM from one polarity terminal of the spark drive electronics 15 power supply through its quill to the adaptor 24 or other location on the housing. This current propagates through the adaptor, housing 10 and the guide member 3 to the wire electrode 1, due to the metal to metal contact between those elements, through the spark generated at the tip of wire electrode 1, which bridges the gap to the closest surface on the workpiece, through the work-piece, the work-tank, the x-y table and back to the opposite polarity terminal of the power supply.

The electroerosive machining operation is carried out by the movement of the electrode's exposed end 1a relative to the surface of the workpiece 2, according to a predetermined set of programmed instructions provided to the CNC EDM. As the machining operation takes place, the exposed end 1a is eroded away, reducing the electrode's working length, moving the electroerosive sparks back closer to the end of the guide member 3, but not sufficient in distance to prevent the sparks from jumping the slightly widened gap.

The change in spatial position of the spark is detected by a change in the position of the light generated by that spark. One fiber optic line will receive a greater intensity of light than before; the other fiber optic line less than before. The light intensity from each, usually unequal, is monitored by optoelectronics circuit 34 and is reflected at the latter's respective two outputs as digital information, which is relayed to the NC computer upon the computer's command. More specifically, the first and second optical fibers, 48 and 49, respectively, are adapted for relatively narrow fields of view centered a predetermined distance in front of the tip 47 of the guide member.

The NC apparatus 8 is programmed to periodically check the digital information relayed from the outputs of optoelectronics circuit 34 to determine if electrode position adjustment is required. The NC apparatus compares the two outputs, that is, determines the ratio between the light obtained through optic fiber 48 with that obtained through optic fiber 49, and then compares that ratio to the ratio, the calibration ratio, obtained at the time the gap was initially set, prior to commencement of machining. It is appropriate to consider how that gap is initially set, which is next considered.

Reference is again made to FIG. 1 to consider initial calibration of the spark gap, between the tip of the electrode and the workpiece. That gap, about two wire diameters, only a few thousandths of an inch or less, must be properly set initially, a calibration function. A considerable body of information empirically developed over the years on the preferred length of gap for EDM machining of each of a number of metal materials and the voltage level and AC frequency required to bridge that gap, that is, to initiate a spark. Thus the operator may select the gap, or, with the foregoing background data installed in the NC computer and the computer programmed to make the selection based on material, the operator will input the data on material, and permit the NC computer 8 to specify and display the desired gap length.

The Spark drive electronics 15 contains a voltage monitor, $V_{MON}$, and/or means to set the tool assembly voltage to the requisite voltage level and AC frequency for the desired gap length; and contains a current sensor, $I_{MON}$, that detects, among other things, the onset of current through the tool assembly, indicative of spark formation. The spark drive electronics supplies that information in digital form to the NC apparatus 8, which is programmed to monitor that voltage and current information for the gap calibration. With the proper voltage applied to the electrode, bringing the electrode the proper distance to the workpiece, the onset of current indicates to the NC computer that the gap is of the correct length. However, because the workpiece involves too many unknowns, such as surface irregularities and the like, a better choice is to make such a calibration instead using a known surface whose position is accurately known, that surface being referred to herein as a gap calibration block.

To calibrate the NC apparatus to the specified gap length, use is made of a gap calibration block 19. The calibration block is an electrically grounded absolutely flat smoothly polished surface associated with the NC apparatus. The wire orifice at guide 3 is in a known built-in spatial relation to the tool mounting means 24, illustrated in FIG. 2. Specifically, by design the orifice in the tool housing of FIG. 2 is located approximately two electrode wire diameters horizontally to the right of the axis 17 of mounting member 24 and a known distance below the upper end of that member. The NC computer also knows the location, that is, the x, y and z coordinates, of the reference calibration surface 19. Prior to advancing wire electrode 1 out the orifice in guide 3, the NC control moves and places the guide orifice at a distance from the surface of reference calibration surface 19 of about two wire electrode diameters plus the length of the desired spark gap. The NC control then initiates operation of the spark drive electronics 15 and applies that voltage to the tool housing 4; and commences advancing the electrode wire 1 from the guide orifice a distance of two electrode wire diameters. A spark is then produced, jumping from the tip of the electrode to the reference calibration surface 19, resulting in current flow at the desired level as monitored at $I_{MON}$. The spark illuminates the ends of the light pipes in guide 3 and the NC control then takes the two light value readings optoelectronic device 34, determines the ratio of those readings as the calibration ratio and saves that calibration ratio in memory. The particular absolute value is not so important as it is only necessary for the NC apparatus to duplicate whatever value it has obtained through such calibration procedure at the workpiece. With that calibration ratio obtained, the NC controller 8 initiates machining of the workpiece.

Operator input to the NC apparatus 8 includes the shape of the finished surface and the shape of the workpiece 2 at start. That information may be entered by the operator downloaded to the NC computer from a CAM program, such as Mastercam™ software or the like. The operator will also input the workpiece's approximate location and orientation on the work table; the identification of the workpiece material, such as steel or aluminum, as example, and the desired surface accuracy, i.e. Minimum edge radii, dimensional tolerance, maximum allowable roughness and the like, identify the electrode material, and the electrolyte, also referred to herein as the dielectric fluid, used.

At this juncture, an expert program, may be written to advise the operator on the best combination of tools to be used for optimum machining efficiency, such as quick machining with the "scooper" electrode, earlier herein described, or a large wire diameter electrode initially, a list of "must have" tools and their preferred sequence of use, the voltage and current settings for all EDM operations and the estimated time to completion of the machining job. The operator then places the tools in a tool changer, if available, such as in the robotic system described herein, or the operator may choose to override the computer generated suggestions and enter information of the actual tools to be used, electrode wire diameters available and so on. If, as in the system of FIG. 1, there is no tool changer, the operator mounts the first tool. The expert program may advise of the duration or time required for the next tool change. Absent such an expert program, however, the skilled machinist necessarily relies upon personal judgment gained through experience.

The operator puts the electrolyte dams in place, if any are being used in the EDM apparatus, and then signals the EDM computer that machining operations may commence. The EDM computer then initiates the flow of the dielectric fluid. The machine then calibrates gap location on calibration surface 19, and then identifies at least two outer surfaces of the workpiece. As earlier described in connection with the calibration the computer "knows" the values of voltage and current representing the desired spark gap, also has stored the approximate workpiece location inputted by the operator, and also is able to accurately position and track the instantaneous coordinate position of the quill arm electrode.

In this step, the EDM apparatus moves the quill arm to one side of the approximate location of the workpiece, and then incrementally moves the tool housing and electrode closer and closer to that one side, monitoring Vmon and Imon for the machining voltage and current. When the electrode is at the spark gap distance, the Vmon voltage and Imon current change to the proper values. At that time, the computer takes note of and stores that side location in memory. It then proceeds to position the electrode at the set approximate location on an adjacent side of the workpiece. The EDM computer backs up the tool assembly, and rotates it by ninety degrees about the axis. It then moves the tool assembly in the direction of the side to the approximate location set by the operator and proceeds in the same manner to locate the exact position of that side. Being programmed with geometrical shapes the computer can determine also the exact location of the corner of the workpiece, should the workpiece geometry contain a corner. In the foregoing manner, the EDM computer acquires exact workpiece location. Where the particular job requires, the machine also takes additional surface readings to verify workpiece height and "squareness" of the setup. Following that the EDM begins the machining process, "painting" the desired shape into the workpiece surface, line after line, layer after layer, as desired.

It may be noted that as material is removed from the workpiece 2 during the machining process, the current level monitored changes and may extinguish entirely, which the NC computer recognizes as a signal to increment the coordinate position of the tool assembly along the surface of the workpiece. Should the surface contain a protrusion or bump, a greater current level will be realized.

As those skilled in the art appreciate, the calibration procedure used in the prior EDM systems does not take into account erosion of the electrode following initial gap calibration. With erosion, the end of the electrode recedes gradually. Eventually the erosion is great enough that the gap established based on the information in the NC computer memory is larger than desired. As a result, a smaller current flows and less material is removed from the surface, slowing the machining procedure. In the prior system proposed in the Inoue patent U.S. Pat. No. 4,543,460, one procedure for gap adjustment during machining is suggested. In other systems, however, unless the machining procedure is halted, and the tool assembly is recalibrated, EDM slows down. And eventually with conventional generic electrodes, erosion is sufficient, even in the system suggested in that Inoue patent, as to require replacement of the electrode. The new wire electrode and optical sensor combination eliminates the foregoing variability introduced into the machining process through electrode erosion.

Returning to FIG. 3, assuming the NC computer checks the information from the optoelectronics circuit 34 and finds the light ratio has attained a predetermined departure from the ideal ratio, the calibration ratio, as determined by the NC computer's program, indicative of significant electrode wear, the NC computer issues a command to stepper motor 53 to advance one step. In response stepper motor 53 turns the capstan 52 a small fraction of a turn, which advances wire electrode 1 a short distance, as example, one micron, along the path earlier described and through channels 33 and 46, pushing the wire's end 1a forward in the same amount. As the generation of EDM sparks continues following that movement, the light from the next spark is again monitored by the optoelectronics circuit and supplied to the NC computer. If the information is interpreted by the computer as having restored the wire end 1a to the correct position, no further stepper commands are given. It, however, the NC apparatus determines that the movement was insufficient, it issues another command to the stepper motor 53, causing it to advance the wire electrode another step. This procedure continues until the NC apparatus determines that the wire end is correctly positioned.

Figure 5:
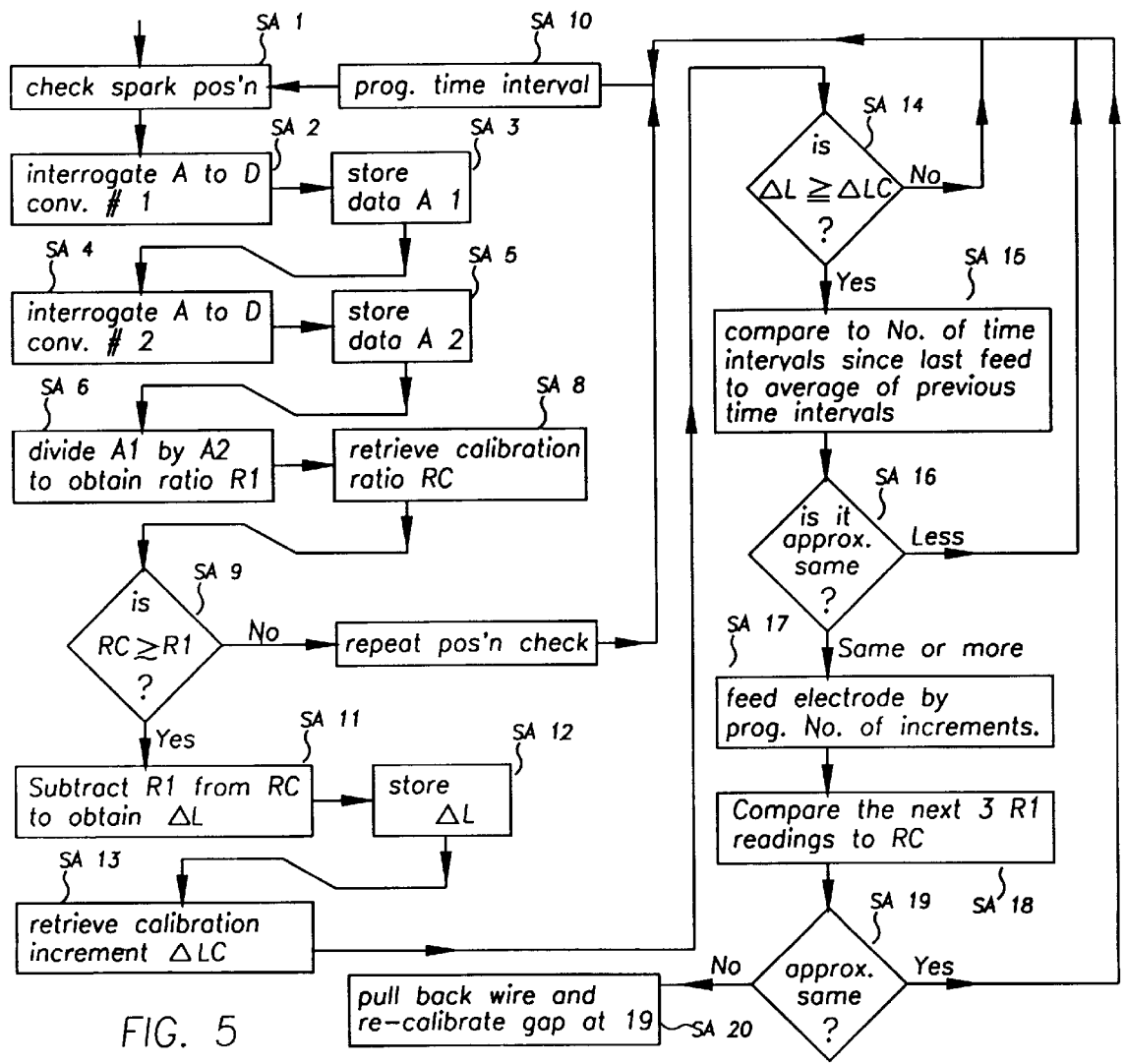
FIG. 5 is a flow chart of the program used by the NC apparatus in connection with the optoelectronic circuit of FIG. 4.

The foregoing procedure is easily programmed in the NC computer by a programmer skilled in the NC machining art and may be attached as a branch routine to the main executive program in the NC apparatus computer. As example, such a program may appear as in the flow-chart of FIG. 5 to which reference is made. Branching from the main program, the program initiates a check of the spark position, as at SA-1. To do so the computer interrogates the first unit, as at SA-2, and stores the digital information received from the optoelectronics circuit 34 as at SA-3. Next the computer makes a like interrogation of the second unit, as at SA-4, and likewise stores that digital information, as represented at SA-5. The computer then determines the ratio of those values, dividing data A1 by data A2 to obtain a ratio, R1, as at SA-6. Ratio R1 is stored temporarily and the computer then, as represented at SA-8, retrieves the calibration ratio, RC, which was obtained and stored during the calibration routine, earlier described.

The computer then compares those ratio values to determine if the calibration ratio RC is larger than R1. As earlier described a larger ratio means that the electrode has eroded. If the ratio remains at essentially one, there is no erosion. Should the decision at decisional block SA-9 be negative, no action is required and the computer waits a short interval and returns control back to the main program, as represented at block SA-10. If, however, the decision is affirmative, the computer determines the magnitude of that difference by subtracting the value of R1 from RC, as represented at operational block SA-11, and temporarily storing that increment, ΔL, as at SA-12. The computer then retrieves from memory the calibration increment, ΔLC, as at block SA-13. The calibration increment is set by the program as a function of the gap, when the size of the spark gap is set to match the intended work surface accuracy and finish quality.

Accurate surfaces generally need to be smooth, except for surfaces that are required to have a textured finish. Greater accuracy and smoother surfaces call for a smaller gap with less energy expended in each spark. A greater gap with bigger sparks erodes the workpiece faster, but the surface finish is rougher than with the smaller size gap. Under rougher cutting conditions the expected variation between optical signals 38 and 39 may vary inherently more than under fine conditions. Thus, setting the feed increment in accordance with the gap size chosen results in a more predictable and stable servo operation of the foregoing gap location maintenance system.

Therefor at decisional block SA-14 the computer determines whether the increment ΔL, is equal to or greater than the calibration increment ΔLC. If the decision is negative, the program returns control to the main program, operation block SA-10. However if the decision is affirmative, the computer initiates operation of stepper motor 53 to advance electrode 1 forward by the number of increments desired for the adjustment, a number programmed into the computer.

As an additional feature, the programs include subroutines intended to prevent premature stepper and/or alert the operator to stepper failure. Thus, prior to actually commanding operation of the stepper, the program first makes a check to determine if the stepper is being actuated too soon, that is, within a time interval from its last actuation that is significantly less than the historical average of such intervals.

For this check, the computer maintains a record of the time at which the stepper motor was last actuated by the program to adjust the electrode position. It also determines and maintains the average time interval that is obtained by averaging the time intervals required in the past between successive stepper motor actuations during the machining run, including therein a minimum default time interval. That historical record serves as a check against failure of the program or equipment and eliminates inappropriate response to spurious signals caused by erosion particles briefly occluding an optical fiber aperture. The program then determines the time interval between the last stepper motor actuation and the current time, at which the program is preparing to initiate the stepper motor and compares that calculated time interval to the average, as represented at operation block SA-15.

The program then compares the measured time interval to the average time interval as at decisional block SA-16 to determine if the measured time interval and the average time interval are approximately the same. If less than that average value, the decision is negative, the control is returned to the main program via operational block SA-10, and the stepper motor is not actuated. That serves as a protective buffer between the computer which runs through the program at a very high speed and the stepper motor which relatively speaking is very slow, so as to avoid unnecessary runaway stepper actuation. However if the measured time interval is the same or greater than the average, the decision at block SA-16 is positive, and the program actuates operation of the stepper motor, as represented at operational block SA-17.

Next, as represented at operational block SA-18, the program checks the next three determinations of the ratio R1, resulting from interrogation of the A/D converters, as represented at SA-2 and SA-4 and compares each to the calibration ratio RC. If the values obtained are approximately the same, as determined at decisional block SA-19, a positive result is obtained and the program returns control to the main program. The foregoing indicates that the stepper motor has in fact advanced the electrode the requisite distance. If, however, the decision is negative, some failure of the equipment is indicated and an alarm, represented at SA-20, is initiated. In the foregoing manner the length of the protruding portion of wire electrode 1 is essentially maintained proper, eliminating the effect of erosion of the electrode's end. The foregoing protective program features are recognized as exemplary. Other equivalent subroutines may be substituted for those described to accomplish the same result, without departing from the invention.

By taking the ratio of the two signals and referencing that ratio to the ratio taken during calibration, the calibration ratio, the effect of ambient changes is minimized. As example, each light pipe is formed of a pair of optical fibers that are arranged in a series transmissive light path, one portion of which is in the tool housing and other portion of which lies in the tool guide. Those optical fibers are oriented so that the end of one faces the other, placing them in series and allowing the light admitted from the guide end to propagate to the associated photo detector. Should dirt or other detris find its way into that interface between the two series connected optical fibers, the dirt would attenuate the light intensity that reaches the photo transistor in that one light pipe.

Assuming the foregoing light pipe would normally receive greater light intensity than the second light pipe, one would normally obtain a light intensity ratio greater than one. With the dirt attenuating the light path, that intensity ratio with the second light pipe may, as example, be reduced to less than one. However, on the start of machining, the earlier described calibration ratio is first obtained. Calibrated with the dirt present, the calibration ratio obtained and stored in the computer's memory will in accordance with the foregoing assumption then be less than one. The tracking of the spark position is made to the latter intensity ratio. So long as the computer tracks the virtual position of the spark, the electrode positioning control maintains the position of the spark fixed in spatial position during machining by adjusting the electrode's end so that the light obtained from each light pipe obtains that same ratio.

As one appreciates the foregoing minimizes maintenance requirements for the machining apparatus. Using an intensity ratio, the technician is not required to ensure that the apparatus be maintained in absolute cleanliness as would require frequent removals from service, "down time", during which machining is necessarily postponed.

Those skilled in the art recognize that other comparisons may be taken between the signals from each of the two light pipes, such as subtracting one from the other to obtain a difference, and such difference signal can be used by the computer to control spark position. However, even though such alternative falls within the scope of the present invention, those alternatives do not appear to provide the foregoing benefit, and are clearly less preferable than the ratio.

As one appreciates, the foregoing system adjustment system compensates for wear in the tool electrode automatically. In the prior NC EDM apparatus, such as found in Inoue U.S. Pat. No. 4,543,460, referred to in the background to this specification, the gap between the end of the electrode and the work piece is proposed to be directly monitored by a gap detector; and when the gap increases, indicative of excess wear, a Z axis-adjustment is made of the entire tool housing to bring the end of the electrode back to the desired distance to the workpiece. However, it is recognized that at some point the electrode in Inoue's system becomes so worn down that it is no longer possible to move the tool housing any closer to the workpiece. In that event, the Inouye EDM must be shut-down, the remnant of the electrode removed and a new electrode installed in its place. In addition to its function for contour control, the additional function given to the Z-axis control in Inoue's system, though helpful in eliminating some maintenance, cannot reduce maintenance as significantly as the present invention.

The present invention obviates such maintenance and renders it unnecessary. And, since the electrode is of an essentially indeterminate length, the EDM may be operated virtually unattended.

It is noted that the present EDM system of FIG. 1 does not contain a gap monitor such as found in the Inoue patent U.S. Pat. No. 4,543,460 and is not required by the present invention. Should such a gap length monitor prove effective, as those skilled in the art realize, such a device may also be added to the foregoing system of FIG. 1, without departing from the present invention.

The detection and control functions of the equipment detects the position of the spark and, by controlling the extension of the electrode, ensures that the spark is in a known position. The detection equipment need not detect the actual spacing to the workpiece surface, since that distance might vary in amount slightly from place to place along the workpiece due to the appearance of ridges and valleys visible microscopically characteristic of surface roughness. By thus continuously monitoring the location in space where electroerosive machining occurs, the accuracy of the machined surface achieved during machining is unaffected by the degree of surface roughness presented in that surface for accurate machining.

Gap size, typically less than a few thousandths of an inch, is changing as the electrode tip is moved by the CNC to "paint" the complex surface of the desired shape. The CNC monitors the length of that gap indirectly by monitoring the spark discharge voltage and current. As the gap increases through erosion of the workpiece underlying that tip, the CNC moves the electrode tip in the desired direction until the gap decreases to the minimum desirable size at another adjacent location. As material is removed by the sparks at that additional location, the gap again increases in length, and the electrode tip is again moved to the next position where the gap is a minimum, and so on, until the surface is completed. The foregoing is an orderly and predictable process.

What is not orderly, are variations in workpiece and electrode materials that affect their erosion rates. Since the gap focus is located by sensors and maintained at that position by the electrode wire feed, the effect is to compensate for those variables. Initial work surface irregularities, however, show up as gap size changes that do not correspond to CNC machine driven motion. A "bump" will decrease the gap more; a "hole" increases it. Spark voltage and current being monitored by the CNC EDM apparatus, the EDM apparatus reacts to a bump by slowing the rate of "painting" the surface, and, if there is a hole, the feed can skip that area until a surface location is found where the gap gets small enough for EDM cutting current to resume.

In ordinary sinking EDM, a bump causes a lasting pit in the electrode. Another more frequent source of pits in both electrode and workpiece is "DC burn", where an unflushed piece of metal debris creates an arc that removes more material than desired from both electrode and workpiece.

The present invention maintains an effectively non-wearing electrode tip. Gap voltage and current sensors control the rate of feed of the electrode tip along the surface as the tip effectively paints the desired surface, layer by layer in the workpiece, much as a sculptor chips away at layers of unwanted marble with a fine chisel to sculpt a statue, but those sensors do not control the electrode replenishment.

With gap control in existing EDM equipment, whether of the predictive type or with actual measurement apparatus, such surface roughness is at least partially reflected in the final surface finish. Since the adjustment of the length of the portion of the wire extending from the guide orifice is essentially independent of the gap length, the cutting action is not affected by the prior condition of the workpiece. That is, any hills and valleys that may be present on the workpiece surface do not influence the adjustment, and are not be reflected in the electroeroded surface as would be the case if the measurements are sequentially taken from those hills and valleys during cutting. Thus using conventional EDM gap measuring and correction procedures, the hills and valleys existent in a rough surface would result in the same hills and valleys in the surface as cut, reproducing the same rough surface. With the present invention, with spacing measurements uninfluenced by those hills and valleys, EDM cutting eliminates those hills and valleys producing a smoother surface, a decided additional advantage to the invention.

It should be appreciated that in less preferred embodiments of the foregoing EDM system, the spark monitoring device, including the fiber optics and optical detector, may be omitted, and other less direct means for determining when significant electro-erosion of the electrode occurs for initiation of stepper motor 53. As example, with knowledge of the electrode material, the material constituting the work piece, the electro-erosive voltage, current and time during of application, the degree of electrode erosion and, of course, workpiece erosion is fairly predictable. Typically EDM users have on hand handbooks and tables equating that information with a specified amount of tool wear.

In that instance the NC computer program incorporate an appropriate algorithm or sub-routine program for determining electrode wear, accepting the user entered data on electrode and workpiece material, and integrating the voltage information, current information, which properties the NC computer already controls, and integrating that information with time. The foregoing computation is made periodically by the computer, essentially as a branch of the program. It retains the predicted wear and compares it to its memorized electrode wear tables. When the computer so "predicts" that the degree of electrode erosion has reached a predetermined level, suitably a level equal in amount to that increase in electrode advance inherent in one step of stepper motor 53, the computer then issues a command to the stepper motor to advance the electrode one increment, just as in the prior embodiment when the computer determined erosion information from the information supplied by optical detector 34. Even though such predictive programming produces good result, it is thought to be less accurate than active monitoring, and, hence, is less preferred.

The enhancement in accuracy resulting from the spark position monitoring and adjustment technique, results in better surface quality on the electro-eroded surfaces than heretofore, reducing or eliminating the necessity for mold polishing. The unique single-point tool can "paint" complex surfaces into the workpiece.

The disclosed tool structure permits more efficient "flushing", that is, removal of the loose particles and other detris generated during the machining operation. Trapping of electrolyte (machining) fluid and generated gas between the discharge electrode and the workpiece, which interferes with the electroerosion process, is eliminated, regardless of the work surface size or shape.

Routing the flushing fluid along the discharge electrode permits heat generated by the electrical arcing at the electrode tip to be carried away by the flushing fluid. The cooling effect permits use of higher discharge currents and reduces electrode wear. Reduced electrode wear translates to lower production cost as less electrode material is required for a given machining operation than before. And, a consequent advantage of the use of high discharge currents is faster workpiece machining. Thus an EDM constructed in accordance with the invention offers significant economic advantage to the user.

As an optional feature the foregoing tool of FIG. 3 can be adapted to include an electrically operated "twister" mechanism 59. Frequently, in conventional EDM apparatus, the end edge of the electrode is found to erode unevenly, which can have some adverse effect on electro erosion of the workpiece. To avoid uneven wear, such prior EDM apparatus include within the tool a motor, under control of the NC computer, to continuously rotate the electrode. Because the rotational position of the tool changes frequently, the spark jumps from different portions of the electrode's end edge. As a result, the erosion of the electrode is more even.

In the present invention the wire electrode 1 cannot be continuously rotated about its axis, without also rotating the storage reel 50, since the wire electrode is attached to the reel. Although not impossible, rotation of the reel is obviously impractical. Instead, the twister mechanism 59 grips and twists wire 1 about its axis by 180 degrees in one direction and then twists it back and continues to 180 degrees in the opposite rotational direction. Such a conventional twisting mechanism includes two skewed rollers pinching the wire, and either one or both rollers rotated to effect a 360 degree clockwise rotation followed by a 360 degree counter-clockwise rotation of the wire tip, another 360 degree clockwise rotation, and so on, until deenergized.

The twister is mounted in housing 21, suitably by brackets not illustrated, and is connected by electrical leads 60 and 61, shown in dash lines, to a contact in connector 23. The NC apparatus supplies the electrical energizing current to twister 59 through a line in the electrical cable connected from the NC apparatus to that contact in the connector.

Figure 8:
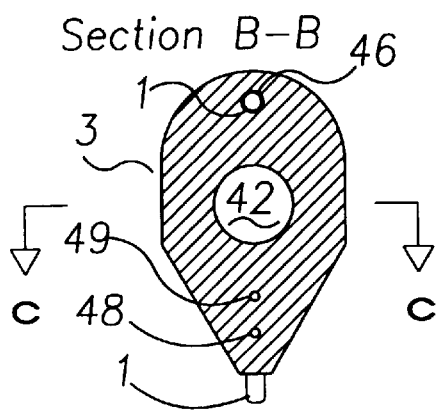
FIG. 8 is a section of FIG. 7 taken along the lines B—B.
Figure 9:
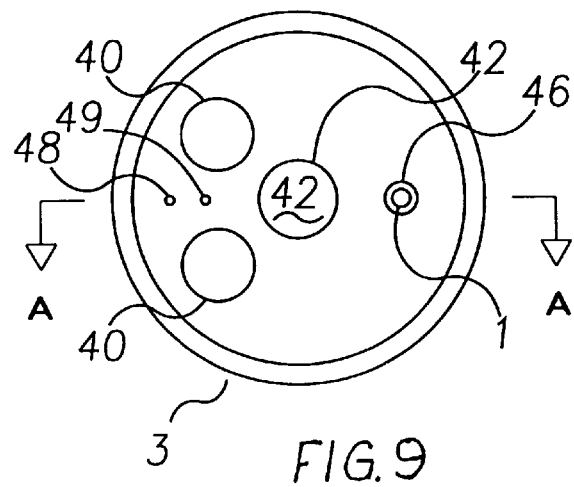
FIG. 9 illustrates the tool guide component of FIG. 7 in top plan view.
Figure 7:
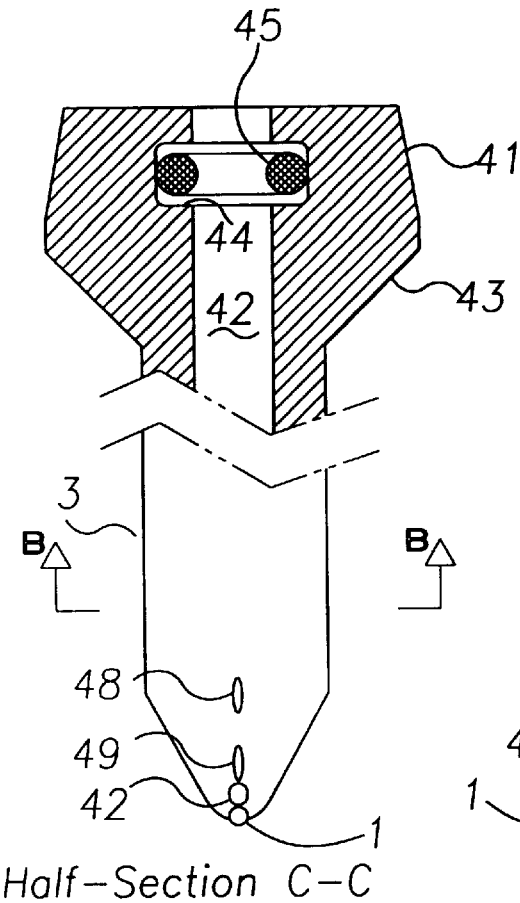
FIG. 7 illustrates the tool guide component of FIG. 6 in a partially sectioned side view.

Earlier reference was made to FIG. 6 showing a side section view of the tool guide 3. To ensure understanding of the construction of that guide, reference is made to accompanying views thereof presented in FIGS. 7, 8, and 9. FIG. 9 shows the top view of the tool guide. This end forms the quick disconnect that plugs into the tool housing of FIG. 3. In this view the two guide pins 40 are both visible. FIG. 6, earlier discussed is a section taken along the lines A—A in FIG. 9. FIG. 7 illustrates the tool guide in a partially sectioned front view. The orifice to the flushing channel 42 is located just above electrode 1. FIG. 8 is a section of the guide taken along the lines B—B in FIG. 7. The tool guide or holder may be constructed of two symmetrical halves of metal along what is the vertical axis of symmetry in FIG. 8 and diffusion bonding them together to form a one-piece assembly. The various passages are easily grooved into the faces of the separate pieces, suitably using EDM and form complete passages when the two pieces are mated together. It is appreciated that other construction techniques may be used to assemble the tool guide 3. A less difficult construction is used for the alternative electrode embodiment next discussed.

The feed assembly embodiment of FIGS. 1–3 used a sideways directed electrode. However, it should be recognized that the wire electrode may be directed in other directions as well, and, in particular, in a downward direction. Reference is made to FIGS. 10, 11 and 12 which respectively illustrate in side, front section, and section, another guide member 3' in which the wire electrode 1' is directed downward. For ease of understanding, the elements of this embodiment are identified by the same number used to identify the corresponding element in the preceeding embodiment and primed. Thus FIG. 10 shows a side section view of guide member 3', FIG. 11 shows a front view of that element, and FIG. 12 shows a section of the guide member taken along the lines A—A in FIG. 10.

One should note pins 40' on the top side and the shaped upper sidewalls 41' and 43' are identical with that of the preceding guide and are of the same size. Essentially the guide member 3 of FIG. 6 is removed from tool housing 21 in FIG. 3 and the guide of this figure is plugged into the housing in its place. Since the elements are the same as in the preceding guide embodiment, it is not necessary to repeat the description. A principal difference is that electrode conduit 46' takes a route through the guide member that smoothly curves to a vertically downward direction at the lowermost end of the guide member. Hence electrode 1' projects downward, its end surface 1a' being essentially horizontal in the figure. Further, the fiber optics channels are directed differently than before. The fiber optics 48' and 49' are directed to the left in the figure. The axis of fiber optic 49' is directed to intersect the axis of electrode 1' at a position just behind the electrode's end surface 1a' and the axis of fiber optic 48' is directed to intersect the axis of the electrode just slightly in front of that electrode end surface. In operation in the EDM apparatus, this guide member functions the same as the prior guide member, which is not repeated.

FIG. 12 illustrates a section of guide 3' taken along the lines A—A in FIG. 10. As shown in FIG. 12, the guide is formed in two parts 3'a and 3'b, which are fastened together along their flat surfaces. The various channels and passages 42', 46', 48' and 49' are formed by EDM machining the channels into the solid metal of part 3'*a*, and along the desired route illustrated, essentially forming channels or passages that are open along the side surface of guide part 3'*a*. Passage crossovers are easily handled by creating deeper channels for the optic fibers, deeper than the fluid passage, and then "potting" the fibers with a suitable epoxy so the flushing fluid cannot move them. Then the flat metal cover 3'*b* is fastened to the side of guide part 3'*a* to cover those open channel sides and seal the passages.

As shown, wire electrode channel 46' is formed in rectangular cross-section. Flushing channel 42' is of a U-shape cross-section containing an open side. Its depth is reduced in the area marked 58' to just less than half the depth of the wire channel 46'. That restriction in the channel area causes the flushing fluid introduced into the upper portion of the channel at a given pressure and velocity, to increase in velocity in the channel's lower region adjacent the electrode orifice. The increased velocity of the flushing fluid enhances cooling of the electrode.

As one appreciates, one advantage to employing the quick disconnect connection between the guide 3 and the tool housing 21 is that it permits the guides to be replaced. As example the guide of FIG. 3 which contains passages that orient the wire electrode in a sideways direction may be replaced by the guide of FIG. 10 whose passage for the wire electrode is directed vertically downward. Such a change over ability adds to the versatility of the apparatus in permitting a quick change in machining.

To accomplish that change, the wire electrode must be withdrawn through the guide that is in place. Withdrawal is accomplished by operating the stepper motor 53, the electrode positioning mechanism, so that it rotates in the opposite direction, that is, retracts the wire into the tool housing. When retraction occurs, assuming reel 50 is mounted so as to be free-wheeling, the retracted electrode portion, approximately one or two inches in length, is simply pushed into the feed assembly module and permitted to loop about and slacken, as it cannot be pushed back onto the reel. Such a reversing command may be issued at the apparatus's control panel. It is for the foregoing reason, as earlier noted, that the positioning or stepper motor 53, is required to be bi-directional. In alternative embodiments in which that feature is not needed, then uni-directional stepper motors may be substituted.

Another aspect of the present invention, earlier introduced in the preamble to this description, is to enable an EDM to slice through and scoop out chunks of metal from the workpiece, much like a butter knife cut outs a slice from a block of soft butter. Termed "roughing", the procedure expedites, as example, the formation of a cavity in a workpiece by minimizing electroerosion time. The curved cut is made into the workpiece eroding only the metal along the surface of the cut, essentially severing a chunk of uneroded metal from the workpiece, and that severed chunk is then carried away and discarded. The basic cavity is thus opened with a few slices and then the more fine erosion process, using the point source electrode previously described, is used to cut the walls to exact dimension and smoothness. The time taken is less than required to electro-erode all of the metal necessary to form the cavity, using only the point source electrode.

For roughing operations, that is cutting out and removing large quantities of metal, the EDM apparatus employs a different electrode than in the preceding embodiments and, accordingly, a different guide and the NC apparatus employs some alternative programming, which are additional inventive aspects of the present invention next described. As becomes apparent from the following description, the EDM apparatus using the new scoop electrode also offers the advantage of minimizing electrode replacement and provides for reduced operator attendance during the electroerosion process.

Figures 13, 14:
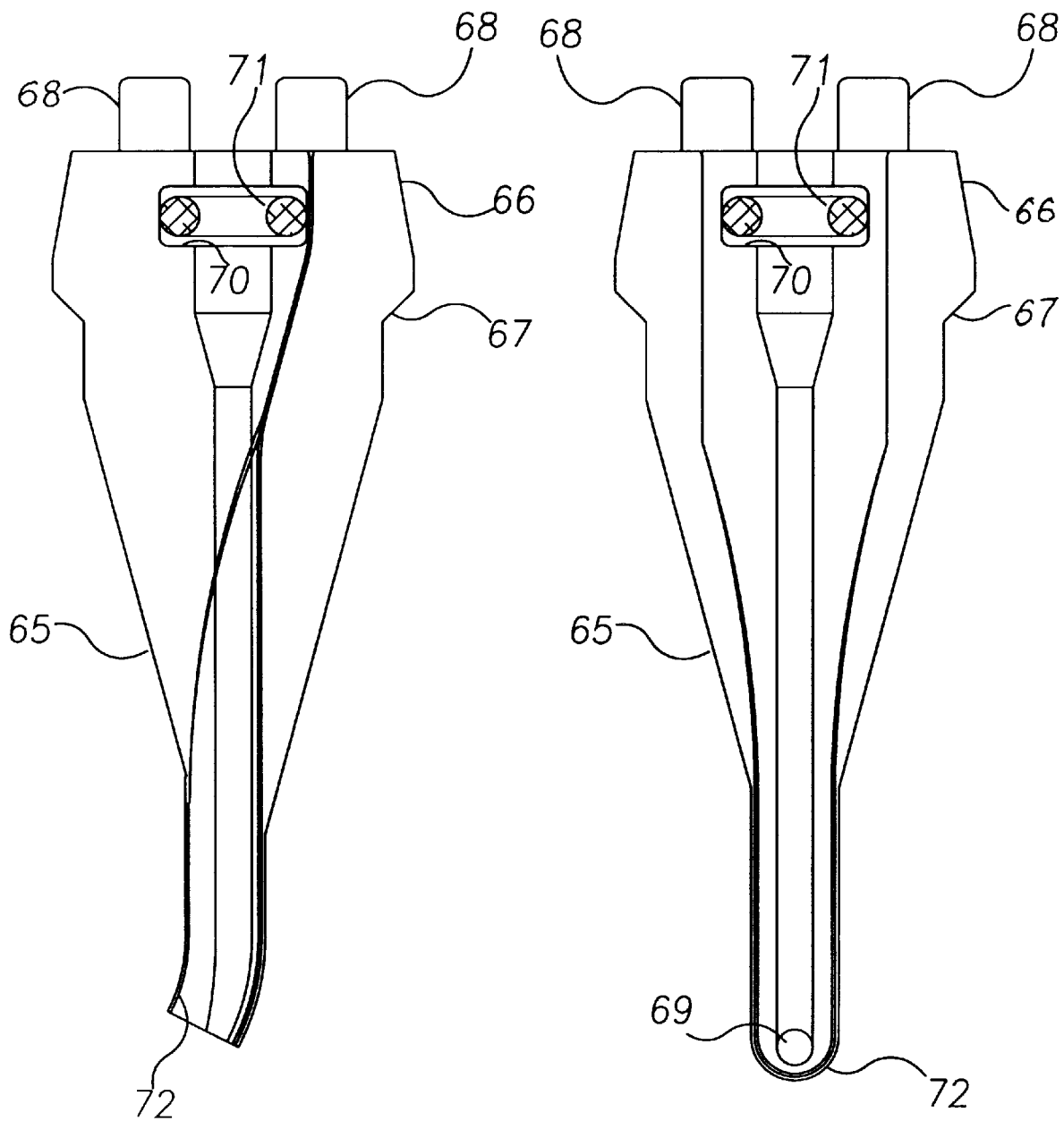
FIG. 13 is a side section view of the new scoop forming guide as may be used in the system of FIG. 1 for roughing operation.
FIG. 14 is a section view of the scoop forming guide of FIG. 13 as taken from the front.

Reference is made to FIG. 13 which illustrates a guide member 65 in a side section view and to FIG. 14 which is a front section view of that guide member. Like the prior guide members, guide member 65 includes an shaped upper walls 66 and 67 and a projecting pin 68 with which to angularly orient and press-fit the guide member into a housing, such as housing 21 in FIG. 3, a dielectric machining fluid conduit 69, circular groove 70 and an O-ring 71, seated in that circular groove, surrounding the fluid channel for sealing connection to a coolant tube outlet protruding from the housing, and an electrode channel 72.

Further reference is made to FIG. 15 and FIG. 16 which respectively show views of the guide member corresponding respectively to FIGS. 13 and 14, but containing views of the ribbon electrode 75. Referring to FIG. 15, the electrode is in the form of a flat web or ribbon 75 with V-shaped notches 76 formed into the side edges on each side of the ribbon. The ribbon extends into the upper end of the guide member. As the ribbon is forced through the guide member, as hereinafter described in greater detail, its shape is extruded by the walls of guide passage 72 into a semi-cylindrical shape, as represented at portion 75*b*, in FIG. 15; and then curled into the semi-torroidal or scoop shape, as represented in FIG. 15, as the ribbon's end portion is gradually pushed out the end of the guide member.

To accomplish that extrusion the channel through the guide member is appropriately shaped as illustrated in FIGS. 17 through 20. Thus FIG. 17 shows a section of the guide member taken along the lines A—A in FIG. 15 and illustrates the entry portion of electrode channel 72 as straight and flat, the shape of the thin flat ribbon 75 as it enters. FIG. 18 shows a section taken along the lines B—B in FIG. 15 and illustrates that lower extent of the electrode channel 72 as being curved, a somewhat Gaussian curve shape. Still further down the channel, FIG. 19 shows a section of the guide member taken along the lines C—C in FIG. 15 and illustrates that the electrode channel 72 is formed into a deeper U-shaped or somewhat semi-circular curve. And still further down the electrode channel, FIG. 20 shows a section of the guide member taken along the lines D—D in FIG. 15 and shows that electrode channel 72 is fully formed into the semi-circular or U-shape. Thus as the thin flat malleable metal ribbon electrode 75 is pushed through the guide member's electrode channel, its shape is transformed from flat into a U-shape. However, the axis of that U-shaped portion is as yet essentially straight.

Reference is again made to the side view of guide member 65 in FIG. 15. As illustrated, the lower exit end of electrode channel 72 and the guide member is also shaped into a circular arc. Thus as the now U-shaped electrode 75 is forced through this section, its shape is further shaped or curled into a semi-circular arc. That is, the axis of the electrode is transformed from a straight line to a circular arc.

At this juncture in the passage of the ribbon through the guide member, the v-shaped notches 76 close up to form a smooth complete wall. It is appreciated that the size and shape of those notches is selected so that the now U-shaped electrode may be curved into the arc of the diameter selected and form a smooth circularly curved wall, without introducing crimping. Without the notches, one recognizes that the electrode's side walls would be crimped as the electrode is bent into a circular arc, and that such crimped portions could interfere with operation of the EDM, such as by jamming the guide member.

Although the ribbon is malleable and does not require much force for the extrusion, it also possesses a degree of stiffness. In being pushed through the extrusion surfaces in the guide, the ribbon encounters some friction, exerted by the surfaces walls. The forward axial force exerted on the ribbon necessarily overcomes that friction in order to move the ribbon forward. That applied axial force is also used by the guide's extruding surfaces to shape the ribbon into the described shape. The pushing force on the ribbon is thus necessarily greater than would be required to push the ribbon forward in the absence of the extruder in the guide. Thus the ribbon should be stiff enough to withstand the necessary axial force exerted by the feed mechanism without crimping or collapsing and jamming the guide passage.

In the operation of the invention, ribbon electrode 75 is incrementally pushed through the guide, while electro-erosion of the workpiece is on going. Thus initially the tip end of electrode 75 would appear at location T1 in the figure. During continued electro-erosion of the workpiece the electrode is extended to location T2, thereafter to T3, and continuing to locations T4, T5 and T6, ultimately forming the complete semi-circular arc appearing in the figure and completing one scoop. When the scoop is completed, the electrode carries within its side walls a U-shaped chunk of metal that was severed from the workpiece. That chunk may be carried away and disposed of as later herein described.

Guide member 75 is coupled to a housing and feed assembly that, with slight differences, is essentially the same as that illustrated in FIG. 3 for the wire feed model. Because of that similarity it is possible to use the illustration of FIG. 3 for reference and describe the slight differences or changes necessary for use with this guide member. Referring to FIG. 3, ribbon electrode 75 is also wound up and stored on a reel, such as 50, from which the ribbon electrode is dispensed. A ribbon guide replaces the wire guide 31 in the feed assembly and another ribbon guide replaces wire guide 33 in housing 21. The optical detector 34, fiber optic channels, fiber optics, and electrical connections for same are omitted, as they are unnecessary for the scoop configuration.

However, electrical connector 23 preferably should remain of the same construction as before so as to permit continued use with the interface or mating connector to the NC apparatus computer cable. By omitting the foregoing circuits, a number of the connector's contact pins are redundant, but are simply retained disconnected to any circuit in the tool housing. So doing avoids any necessity of another interface cable to the computer, a feature that is useful, as example, in the robotic EDM system later herein described. The set up of the EDM for operation with the foregoing tool embodiment is essentially the same as that described for the prior embodiment and need not be repeated.

For this embodiment, the EDM apparatus employs a machining program which as in the preceding embodiment that accepts the information on workpiece geometry and the geometry of the region to be cut from the workpiece, and contains the programming to control of all of the associated elements of the EDM apparatus, such as previously described. From that information the program places the electrode at the starting position, knows when electro-erosion commences, and maintains a record of the number of cuts taken at each location in the workpiece. The program is thereby able to determine when the appropriate depth has been reached in a particular location through multiple cuts, and the next location in the workpiece to perform cutting.

The program also contains the intelligence to determine when the electrode is positioned to begin electro-erosion of the work piece and when a cut has been taken from the workpiece, suitably by monitoring the spark voltage and current at the spark drive electronics. As in conventional electric discharge machining, when the electrode is placed sufficiently close to the metal workpiece, sparking commences, the spark current flows and the spark voltage drops. As workpiece erosion takes place, the spark gap increases. Consequently, the spark occurs later in time (or phase) as the voltage rises in level, approaching the upper limit that is set for the desired surface finish. As recalled, the onset of the spark is indicated also by the onset of spark gap current, and that current is sensed by the spark drive electronics. When the drive voltage subsequently rises beyond the upper limit and the spark current stops, that indicates that the electrode has passed out of the workpiece.

During electroerosion, under NC control, dielectric fluid is admitted from the housing into fluid channel 69 and flows through the orifice adjacent the electrode orifice in the guide member to provide the desired flushing of the waste material. When the described scooping action is completed, the electrode 75 has attained its greatest length of arc. The chunk of metal severed from the workpiece is cradled in that arc. As the ribbon emerges from the surface it entered, it cuts out a piece of solid material resembling a piece of a donut. Further, as the ribbon breaks out of the work surface, sparks no longer jump from the ribbon's end as the "gap" is much too large, and the electrode current ceases. Through the program, the NC apparatus recognizes the rise in voltage and lack of electrode current as the indication that the electrode has completed its scoop. The NC apparatus then retracts the tool assembly away from the workpiece and carries the tool assembly to a cutting or clipper station, not illustrated in this figure, but illustrated in FIG. 18, later herein described.

At that cutting station, the cutter automatically cuts the portion of electrode 75 that protrudes from the guide member's orifice, removing both the curled portion of the electrode and the waste metal that it carried. The cutter may take any conventional form, such as an electric rotary saw which can sever the electrode without modifying the extruded shape of the small stub portion extending out the housing. Other forms of cutters can include even another EDM machine dedicated to serve this limited function.

Following removal of the curled portion, the NC apparatus returns the tool assembly to its position adjacent the workpiece and places the tool into position to permit the electrode to remove another chunk of metal. The NC apparatus then initiates the sparking voltage and commences programmed advancement of reserved portions of electrode 75 through the housing and guide member, as before, to form the new curl.

It is anticipated that a ribbon electrode employed in practical embodiments is of copper will range in size from about 0.0015 inches in thickness and 0.6 inches wide to about 0.003 inches in thickness and 1.6 inches wide. In that dimension, the electrode is fairly malleable and can be extruded as described by the force produced by conventional stepper motors.

It is noted that the main use of the foregoing roughing tool is in hard or brittle materials, such as carbides, or hard-tomachine work pieces, such as fragile or thin walled shapes and the like. It need not be employed in circumstances in which conventional machining is more effective in performing the cutting.

The quick disconnect connector's design for guide 65 is one that provides an attachment sufficiently strong to withstand not only the weight of the guide, but also the downward force exerted on the guide by the ribbon through frictional contact with the guide walls as the ribbon undergoes the extrusion process. The force required to pull the guide away from the tool housing with that quick disconnect connection is substantially greater than the combined sum of the foregoing forces.

Figure 21:
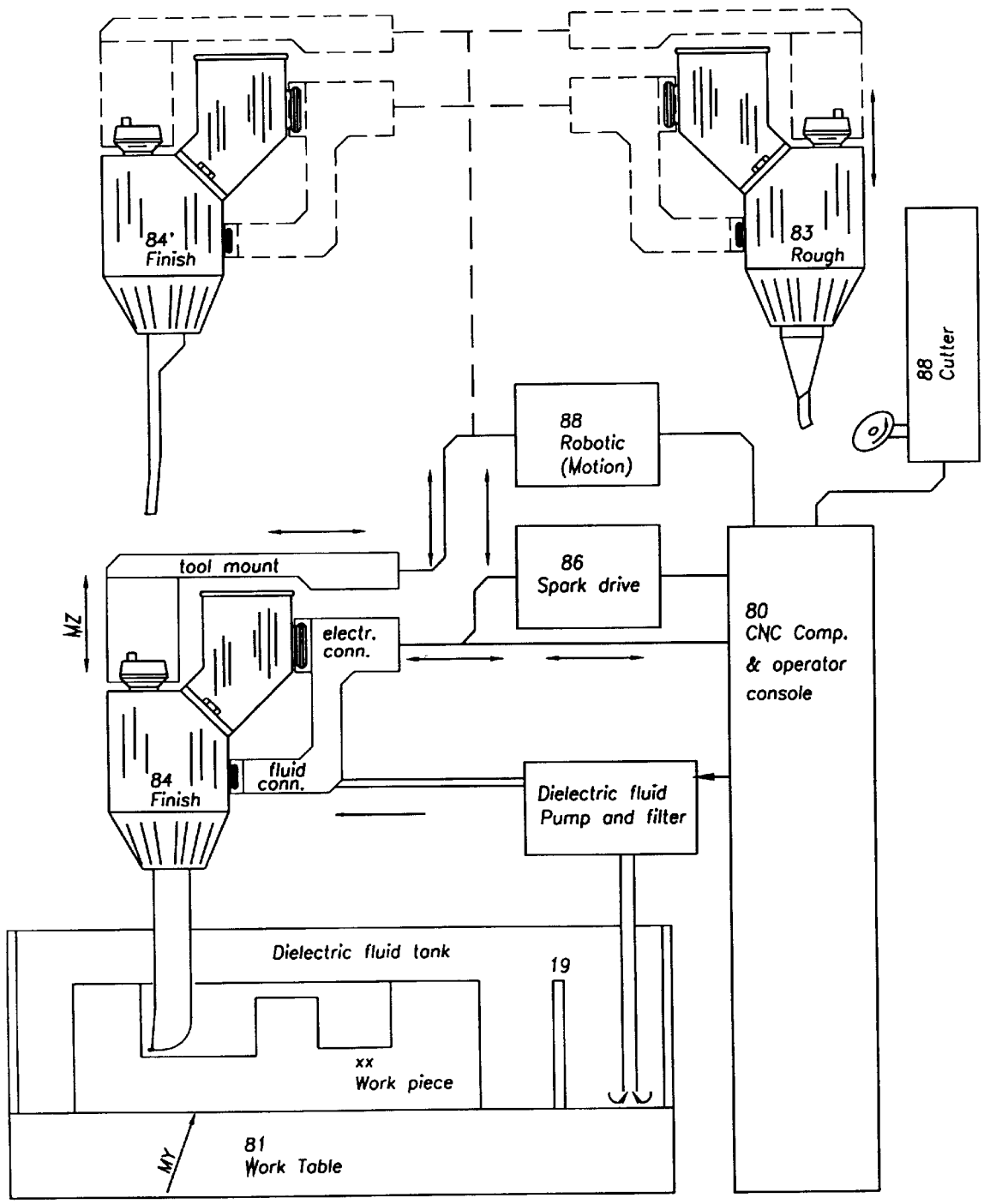
FIG. 21 is a block diagram of a fully automatic 3D NC robotic EDM system that utilizes the roughing and finishing tools of FIGS. 6 and 11.

In addition to application of the foregoing tools in the numerically controlled EDM system of FIG. 1, the tools enable a new and more extensive EDM system that permits the tools to be automatically changed under control of the NC computer, thereby permitting the NC apparatus to employ one tool assembly, such as the tool assembly of FIGS. 13–16, for roughing, and, when the roughing operation is completed, to automatically change to the other tool assembly, such as the tool assembly of FIGS. 2 and 3 and continue EDM through the finishing operation. That new system, another aspect of my invention, is pictorially illustrated in FIG. 21 to which reference is next made.

This system contains an NC control panel and NC control computer 80, which as before controls the motors My, and Mx that position the worktable 81, and motors Mz and Mrz that adjust the height and angular position of an EDM tool cradle 82, which, as hereafter described, is designed to receive and hold the selected one of the two tools, roughing tool 83 or finishing tool 84. When not in use, both roughing tool 83 and a finishing tool 84 are stored in a tool bin, not illustrated, at a location spaced from the cradle 82, as illustrated. NC computer 80, as in the prior embodiments, controls the dielectric fluid apparatus 85, the spark electronics 86 and the clipper mechanism 87. The NC controller also controls a robotic positioning mechanism 88.

Robotic positioning mechanism 88 contains a gripping hand 89 that is capable of grasping, picking up, and moving tools 83 and 84. Under control of NC computer 80, the robotic positioner 88 is capable of selecting the desired one of the two tools, as dictated by the controller's programing to the location of cradle 82 and inserts the tool in cradle 82, thereafter returning the hand 80 to a default position awaiting further command. Robotic mechanisms of this type are well known in the machine tool industry and in the automobile industry, and perform a wide variety of tasks automatically that previously required a human to perform; and robotic machines of that type are easily modified to handle apparatus the size and shape of the EDM tools.

When inserted into the cradle 82, the electrical connections from the electrical socket in the tool 90 or 91 mates with the electrical socket 93 located in the cradle, enabling all of the electrical circuits in the tool to be connected via cable 93, previously described in the preceding tool embodiments, to be connected to the control circuits in the NC controller 80, and permitting the NC controller to recognize that the tool is properly seated in the cradle. The cradle, which is of metal, conducts the spark voltage from spark electronics 86, to the metal housing of the appropriate tool.

A fluid line 94 runs from the dielectric fluid source 85 to a compression type coupling 95, not illustrated, that is mounted in cradle 82. Making brief reference to FIG. 3, it is noted that the screw type conduit coupling 13, illustrated in FIG. 3 is replaced by a compression type coupling when tool housing assembly 21 is used in this robotic EDM system of FIG. 18. Such coupling mates compression type fluid coupling 95 in the cradle in the embodiment of FIG. 18. When robotic grip 89 inserts the selected tool into carriage 82 and locks it in place, the dielectric fluid coupling is automatically completed through the compressive couplings.

The NC controller's programming includes the subroutines for the roughing tool 83, which is the predictive type earlier described in connection with the roughing tool of FIGS. 13–20, and includes the sub-routine to retract the tool, in this case, remove the carriage or cradle 82 to a position adjacent clipper 87, operate the clipper to remove a spent curl shape electrode, and return the cradle and its installed tool back to the position adjacent the workpiece to continue roughing operation, and begin advancing the roughing electrode. And it includes the programming for the finishing tool 84 earlier described in connection with FIGS. 1 and 6 and for the running of the spark position monitor and control circuitry associated with the finishing tool. Additionally the controller includes programming for selecting an appropriate sequence of tools to employ for the cutting operation in order to complete the operation accurately in the fastest possible way based on an interpretation of the information inputted by the operator on the size, kind and type of cavity or shape that is to be cut into the workpiece and the workpiece material.

The foregoing description should enable a programmer experienced in EDM NC programming to prepare the appropriate software that enables the NC apparatus to achieve the described ends and/or to select and purchase available software and integrate that software with the described operation. Applicant, not being a programmer, has not developed specific software programs.

The foregoing system illustrates only two tools solely for purposes of illustration. However, as those skilled in the art appreciate, any number of tools may be included, including back up or spare tools, and in a practical embodiment a larger number of tools is preferably included.

It is appreciated that the foregoing EDM machine is able to sequentially select and use a succession of different tools and disposable electrodes under software control. The controlling software sold with the machine is able to call for the optimum tools available to finish the job in least time. It the complete tool set is not available, the operator or the software, may choose among the available tools. Using the novel tool assemblies described herein and their automatically replenished supply of electrode material, the EDM machine can be set up and allowed to run on its own, to complete a piece of work virtually unattended.

The foregoing invention offers considerable advantage. The new EDM reduces or eliminates the need to fabricate custom three dimensional electrode shapes required with the sinking process and the in-process maintenance required to compensate for electroerosion of such electrode's shape during use, yet performs the same work.

The new EDM provides roughing and finishing tools that are easy to set up or which may be set up automatically using robotic apparatus, reducing the EDM's downtime and permitting a faster and more efficient machining operation. It is also found that in practical embodiments, the electrode mechanism is relatively light in weight and that weight remains practically constant during a machining run. That minimizes vibration of the electrode and provides essentially constant physical characteristics during the run, which improves the accuracy of the EDM. The new EDM apparatus reduces operator involvement and process control in comparison to that required with the prior EDM's as machining progresses from roughing through the finishing stages. This permits the attending operator to handle a greater number of EDM's simultaneously for greater efficiency and reduced manufacturing cost.

In existing "point to point" EDM apparatus, the discharge electrode is of a fixed length. An upper end or stub end is clamped into its respective tool housing. In the prior apparatus, thus, when referring to the electrode one is essentially making reference to the entire length of the electrically conductive metal. When the electrode is sufficiently eroded, essentially worn away, during EDM operation, the EDM must be halted and the discharge electrode, the tool, replaced with another electrode, and the apparatus restarted. With the present invention, the conductive metal that serves as the electrode is not the same fixed length, but, unlike prior generic electrodes, is of much greater length encompassing a reserved portion, a distinguishing feature of the present invention, and may even be of a length that can be said to be indeterminate. Hence, only a small portion of that metal protrudes from the tool assembly, which corresponds to the working part of the prior electrodes, and the remainder of that conductive metal being held in reserve behind the orifice and within the tool housing. That conductive metal is one continuous length. It should be understood that as used in this specification and claims, the term "electrode" refers to the entire length of the metal conductor, and not just to the length which protrudes from the guide orifice. Thus the reserved portion of the conductive metal is also encompassed within the meaning of the term.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof all of which come within the scope of the invention, will become apparent to those skilled in the art upon reading this specification.

Examples of some of those equivalents and modifications have been earlier described. As further example, the foregoing optoelectronics circuit 34 supplies digital signals to the NC computer. However, as those skilled in the art appreciate, less preferred embodiments may instead provide analog voltages to the computer apparatus, incorporating appropriate analog to digital converters at the inputs to the computer to place the voltages in a form that may be used by the preferred digital computer. Since the digital voltages provide a more reliable signal than the analog, the digital form for transmission to the NC EDM apparatus's digital computer is preferred.

As further example, the spark monitoring apparatus used in the preferred embodiment monitors the light emitted by the spark. That light may be in any desired portion of the spectrum selected, visible, infra-red, ultra-violet or any combination. It should be recognized, however, that the invention is not limited to monitoring the spark's emitted light, since, as those skilled in the art appreciate, the generation of the electric spark generates many different forms of energy, including magnetic, high frequency radiation, and even ultrasonic and other acoustic energy, any of which, though less preferred at present, may be monitored in the same way from two different positions.

As example, two or more miniaturized highly directional microphones may be formed by placing transducers, such as piezoelectric crystals, in the tool guide adjacent the wire orifice. By detecting the sharp ultrasonic pressure variations produced by the spark, as opposed to lower frequencies generated by the fast-flowing dielectric fluid in that region, the same spark location detecting approach used for the light with the optical fibers can be used. As overall microphone gains and efficiencies may vary, as is the case with the optical circuits, directional accuracy can likewise be maintained with the ultrasonic transducers and associated electronic circuits, to enable the spark location to be maintained between the acoustic axes of the microphones.

It is appreciated that the foregoing ultrasonic transducers, as well as the other alternative approaches, require electrical wires to be extended through wire guide 3 into the tool housing 21; and that in order to continue to permit the wire guide to be detachable from the housing, mating electrical connectors would be required to be installed in both the guide and housing, serially connected in those electrical wires. That seems more complicated and less reliable than the fiber optics and is one reason why the alternative spark monitoring devices are not preferred.

As further example, in a less preferred embodiment of the described scoop electrode, the EDM apparatus may predictive programming as the means to determine workpiece erosion and initiate advance of the stepper motor 53, and, hence, the extension of the ribbon electrode. As example, with knowledge of the electrode material, the material constituting the work piece, the electro-erosive voltage, current and time during of application, the degree of workpiece erosion is fairly predictable. Typically EDM users have on hand handbooks and tables equating that information with a specified amounts of workpiece erosion and that information is stored on the EDM apparatus computer.

Thus, the EDM's NC computer program incorporates an appropriate algorithm or routine for determining workpiece and electrode erosion, accepting the user entered data on electrode and workpiece material, and integrating the voltage information, current information, which properties the NC computer already controls, and integrating that information with time. The foregoing computation is made periodically by the computer, essentially as a branch of the program. It retains the predicted erosion and compares it to its memorized electrode erosion tables. When the computer so "predicts" that workpiece erosion and electrode erosion has reached a predetermined level, suitably a level equal in amount to that increase in electrode advance inherent in one step of stepper motor 53, the computer then issues a command to the stepper motor to advance the electrode one increment. As the ribbon emerges from the workpiece, it cuts out the piece of solid material, and through the predictive algorithms used in the program, the NC apparatus recognizes, more accurately, surmises, that the electrode has completed its scoop. The NC apparatus then retracts the tool assembly away from the workpiece and carries the tool assembly to the cutting or clipper station, earlier described. This is an essentially "open-loop" type system, whereas the preferred system earlier described that relies on the monitoring of the spark gap current is a "closed-loop" system.

Thus the invention is to be broadly construed within the full scope of the appended claims.

What is claimed is:

1. In an electric discharge machining apparatus for cutting into a workpiece through electroerosion, the combination comprising:

a tool housing including an electrode guide, said electrode guide containing a channel and an orifice, said channel defining a curved path leading to said orifice;

an electrode, said electrode having a tip end for juxtaposition to a workpiece to establish a spark discharge gap;

said electrode being held in said tool housing and extending through said electrode guide, said curved path and out said electrode guide orifice wherein said tip end protrudes through said guide orifice for producing an electroerosive spark to electroerode said workpiece, leaving a reserved portion of said electrode located behind said guide orifice within said tool housing; and electrode positioning means for incrementally advancing portions of said reserved portion of said electrode along said curved path and through said guide orifice in small increments during electroerosion of said workpiece.

2. The invention as defined in claim 1, wherein said electrode comprises an elongate continuous filament.

3. The invention as defined in claim 1, wherein said electrode comprises a malleable metal ribbon.

4. The invention as defined in claim 3, wherein said electrode guide further comprises: extrusion means for extruding said malleable metal ribbon into a U-shaped torroidal arc, responsive to said advancing means advancing said malleable metal ribbon through said electrode guide, whereby said protruding portion of said electrode forms a U-shaped torroidal arc.

5. The invention as defined in claim 3, wherein said malleable metal ribbon includes a series of V-shaped notches within and spaced evenly along each of said ribbon's right and left side edges; and further comprising:

forming means for shaping said ribbon from a straight cross section into a curved cross section responsive to said ribbon's advance through said guide and for bending said ribbon into a circular curve as said ribbon exits said guide to define an exposed electrode portion formed into a circular arc, whereby said circular curve increases in arc as said ribbon is advanced out said guide to increase the length of said exposed electrode portion.

6. The invention as defined in claim 1, wherein said electrode guide further comprises: extrusion means for extruding said electrode into a curved tube, responsive to said advancing means advancing said electrode through said electrode guide, to produce a curved hole in a workpiece.

7. In an electric discharge machining apparatus, the combination comprising:

a tool housing including an electrode guide, said electrode guide containing an orifice;

an electrode having a tip end for juxtaposition to a workpiece to establish a spark discharge gap;

said electrode being held in said tool housing and extending through said electrode guide and said electrode guide orifice wherein said tip end protrudes through said guide orifice, leaving a reserved portion of said electrode located behind said guide orifice within said tool housing;

spark position monitoring means for monitoring the spatial position of sparks produced off said tip end of said electrode; and electrode positioning means for incrementally advancing reserved portions of said electrode through said guide orifice, responsive to said spark position monitoring means.

8. The invention as defined in claim 7, wherein said electrode positioning means further comprises:

an electric motor.

9. The invention as defined in claim 8, wherein said electric motor further comprises:

a stepper motor.

10. The invention as defined in claim 8, wherein said electric motor further comprises:

a piezo-electric motor.

11. The invention as defined in claim 8, further comprising:

a reel for storing and dispensing reserved portions of said electrode.

12. The invention as defined in claim 11, wherein said tool housing further comprises:

a first housing; and a second housing; and wherein said reel is mounted in said first housing and said guide is mounted to said second housing;

said first housing being mounted to said second housing;

each of said first and second housings including aligned passages for feeding said electrode from said reel through said first housing and into said second housing; and wherein said spark position monitoring means is mounted within said second housing.

13. The invention as defined in claim 12, wherein said second housing includes:

a releasible connector at an end for detachably coupling said second housing to an upper end of said electrode guide to suspend said electrode guide from said end of said second housing;

a dielectric fluid conduit for receiving dielectric fluid from an external source and propagating said dielectric fluid through said connector to said upper end of said electrode guide;

a pair of fiber optic channels extending through said connector to said upper end of said electrode guide; and an electrode conduit for extending said electrode through said connector into said electrode guide;

said electrode guide further including:

an electrode channel extending between an upper end thereof and said guide orifice for receiving and routing said electrode through said guide orifice;

a fluid conduit extending between said upper end and a fluid orifice for receiving dielectric fluid from said dielectric fluid conduit and expressing said dielectric fluid through said fluid orifice, said fluid orifice being located adjacent said guide orifice to permit dielectric fluid to exit onto said electrode tip; and a pair of fiber optic channels, said fiber optic channels extending between said upper end to respective exits located in the vicinity of said electrode orifice, said fiber optic channels including a fiber optic for propagating light received at said respective exits into respective ones of said fiber optic channels in said first housing portion.

14. The invention as defined in claim 11, wherein said housing comprises a housing portion, said housing portion including:

a releasible connector at an end for detachably coupling said housing portion to an upper end of said electrode guide to suspend said electrode guide from said end of said housing portion;

a dielectric fluid conduit for receiving dielectric fluid from an external source and propagating said dielectric fluid through said connector to said upper end of said electrode guide;

a pair of fiber optic channels extending through said connector to said upper end of said electrode guide; and an electrode conduit for extending said electrode through said connector into said electrode guide;

said electrode guide further including:
an electrode channel extending between an upper end thereof and said guide orifice for receiving and routing said electrode through said guide orifice;
a fluid conduit extending between said upper end and a fluid orifice for receiving dielectric fluid from said dielectric fluid conduit and expressing said dielectric fluid through said fluid orifice, said fluid orifice being located adjacent said guide orifice to permit dielectric fluid to exit onto said electrode tip; and
a pair of fiber optic channels, said fiber optic channels extending between said upper end to respective exits located in the vicinity of said electrode orifice, said fiber optic channels including a fiber optic for propagating light received at said respective exits into respective ones of said fiber optic channels in said first housing portion.

15. The invention as defined in claim 7, wherein said spark position monitoring means includes:
a first light pipe; and
a second light pipe;
said first light pipe having an input end focused at a predetermined spatial position behind the end of said protruding portion of said electrode; and
said second light pipe having an input end focused at another predetermined spatial position forward of said end of said protruding portion of said electrode, whereby light appearing at separate locations that originated from sparks occurring in said spark discharge gap during discharge machining opertion is input into a respective one of said first and second light pipes.

16. The invention as defined in claim 15, wherein said spark position monitoring means further comprises:
Optoelectronic circuit means optically coupled to an outlet end of each of said first and second light pipes for producing first and second outputs indicative of the light intensity received from each of said first and second light pipes;
control means for comparing said first and second outputs of said optical detector means to produce an intensity ratio and for comparing said intensity ratio to a predetermined intensity ratio value, wherein departure of said intensity ratio from said predetermined intensity ratio value is indicative of a change in spatial position of sparks produced off said end of said electrode and, thereby, of said tip end of said electrode, and for producing an advancing signal when said comparison of said intensity ratio departs from said predetermined intensity ratio value by at least a predetermined incremental value.

17. The invention as defined in claim 16, further comprising:
spark position control means, responsive to said advancing signal, for energizing said electrode positioning means to advance said electrode by an increment through said guide.

18. The invention as defined in claim 16, wherein said control means includes:
a programmed digital computer, including a memory and program;
said programmed computer for receiving and storing each of said two digital values representative of light intensity received from said optoelectronics circuit, dividing one of said two digital values by the other to obtain a calculated intensity ratio value, retrieving a predetermined intensity ratio value from said memory, comparing said calculated intensity ratio with said predetermined intensity value and determining any difference, and initiating an advancing signal when said difference exceeds a predetermined increment.

19. The invention as defined in claim 16, wherein said optoelectronic circuit means includes: first and second light conversion means for converting respective received light intensities into corresponding electronic digital values.

20. The invention as defined in claim 19, wherein each of said first and second light conversion means, comprises:
a phototransistor for converting received light to an analog voltage; and
analog-to-digital converter for converting said analog voltage to a digital voltage;
each of said first and second light conversion means possessing a slow-to-react characteristic for minimizing transient effects.

21. The invention as defined in claim 20, wherein said control means includes:
a programmed digital computer, including a memory and program;
said programmed digital computer for receiving and storing each of said two digital values representative of light intensity received from said optoelectronics circuit, dividing one of said two digital values by the other to obtain a calculated intensity ratio value, retrieving a predetermined intensity ratio value from said memory, comparing said calculated intensity ratio with said predetermined intensity value and determining any difference, and initiating an advancing signal when said difference exceeds a predetermined increment.

22. The electric discharge machining apparatus as defined in claim 21, further comprising: a reel for storing and dispensing reserved portions of said electrode.

23. The electric discharge machining apparatus as defined in claim 7, wherein said spark position monitoring means includes an optical system.

24. The electric discharge machining apparatus as defined in claim 23, further comprising means for connecting said electrode guide to a source of flushing fluid and routing said flushing fluid through said electrode guide to express flushing fluid through said electrode orifice; and further comprising: a reel for storing and dispensing reserved portions of said electrode.

25. The electric discharge machining apparatus as defined in claim 7, further comprising means for connecting said electrode guide to a source of flushing fluid and routing said flushing fluid through said electrode guide to express flushing fluid through said electrode orifice.

26. A numerically controlled generic electrode EDM apparatus for electro-eroding a metal workpiece, which comprises:
an electrode for electroerosively cutting an arcuate path through said workpiece to define a chunk of metal having an arcuate surface and lifting said chunk of metal, when cut, out of said workpiece.

27. The numerically controlled generic electrode EDM apparatus as defined in claim 26, wherein said electrode is of extended length and comprises a flat metal ribbon; and further comprising:
extruding means containing an outlet orifice;
said extruding means for shaping incremental portions of said flat metal ribbon into a hollow semi-torroidal shape of incremental arc as expressed through said orifice, responsive to said flat metal ribbon being forced therethrough and out said orifice;

feed means for incrementally advancing portions of said flat metal ribbon through said extruding means and out said orifice until said hollow semi-torroidal shape covers a predetermined arc, whereby said protruding portion of said electrode gradually increases in arc length as additional incremental portions of said metal ribbon are incrementally dispensed to define a scooping motion into said workpiece.

28. The numerically controlled generic electrode EDM apparatus as defined in claim 26, further comprising: extrusion means for extruding said electrode during machining into a curved shape to scoop out a curved hole in said metal workpiece.

29. A generic electrode for an EDM apparatus comprising a flat metal ribbon having first and second sides, each of said first and second sides containing a series of notches therewithin, said notches being of a size and shape to permit forming said flat metal ribbon into a semi-torroid shape, said semi-torroid having relatively smoothly curved walls that are free of crimped portions.

30. An electric discharge machining apparatus comprising:
   an electrode;
   an electrode guide containing a passage for said electrode;
   said electrode being movably mounted within said guide to permit positioning of said electrode relative to the end of said guide;
   positioning means for positioning said electrode with a distal end extending beyond said end of said guide;
   first and second light pipes;
   said first light pipe having an input end focused at a predetermined location forward of said distal end of said electrode;
   said second light pipe having an input end focused at a second predetermined location behind said distal end of said electrode;
   optical detector means for monitoring illumination emanating from the output end of each of said first and second light pipes to monitor light originating with said sparks at each of two locations; and
   control means for actuating said positioning means to incrementally advance the forward position of said distal end of said electrode responsive to a departure of the relationship between the illumination emanating from the output end of said first light pipe and that emanating from the output end of said second light pipe from said predetermined relationship.

31. In an electric discharge machining apparatus, wherein an electroerosive spark is produced in a gap between the distal end of a metal electrode carried in said apparatus and a metal workpiece, said apparatus including control means for positioning said distal end of said metal electrode to vary the length of said gap and thereby position said electroerosive spark at a predetermined spatial position between said distal end of said electrode and said workpiece, the combination therewith comprising:
   spark position control means, responsive to movement of said spark from said predetermined position, for incrementally advancing the forward position of said distal end of said electrode to reduce said gap to said workpiece, whereby said spark is returned to said predetermined spatial position.

32. A NC controlled electric discharge machining apparatus comprising:
   an NC controller;
   a plurality of EDM cutting tools;
   a cradle for holding a single EDM cutting tool; and
   robotic means, controlled by said NC controller, for retrieving one of said plurality of EDM cutting tools selected by said NC controller and installing said retrieved one into said cradle; each of said EDM cutting tools including electrical circuitry and an electrical socket coupled to said electrical circuitry, said electrical socket including at least a pair of electrical contacts supported in electrically insulated relationship to the associated cutting tool;
   said cradle including an electrical socket for interconnection to a mating electrical socket of an EDM cutting tool that is installed in said cradle to connect there through said electrical circuitry of said installed EDM cutting tool; and
   an electrical cable coupled to said cradle electrical socket for coupling to said NC controller for permitting said NC controller to access the electrical circuitry of the cutting tool installed in said cradle.

33. The invention as defined in claim 32, wherein each of said EDM cutting tools further includes: a passage for flushing fluid, said fluid passage extending through said respective cutting tool for expressing flushing fluid through the front end of said respective cutting tool, and a fluid connector for connecting a source of flushing fluid to said passage; and
   wherein said cradle includes a fluid connector for interconnection to a mating fluid connector of an EDM cutting tool that is installed in said cradle to connect there through said fluid passage of said installed EDM cutting tool; and further comprising:
      a source of flushing fluid, controlled by said NC controller; and
      a fluid conduit coupled to said cradle's fluid connector and to said source of flushing fluid.

34. An electric discharge machining apparatus, comprising:
   an electrode guide having first and second ends, said first end including an electrode orifice;
   a discharge electrode having a distal end;
   said discharge electrode being laterally supported by said electrode guide, extending through said electrode guide and being moveable relative thereto through said first and second ends;
   motor means for moving said discharge electrode relative to said electrode guide to position said distal end a predetermined distance from said electrode orifice; and
   position monitoring means for automatically initiating operation of said motor means when said distal end is worn back a predetermined increment from said predetermined distance due to wear during machining to immediately automatically restore said distal end of said discharge electrode during machining to said predetermined distance.

35. The electric discharge machining apparatus as defined in claim 34 further comprising: a reel for storing and dispensing portions of said discharge electrode to replace during machining incremental portions of said electrode worn from said distal end.

36. The electric discharge machining apparatus as defined in claim 34, further comprising means for connecting said electrode guide to a source of flushing fluid and routing said flushing fluid through said electrode guide to express flushing fluid through said electrode orifice.

37. An electrode for an electric discharge machining apparatus comprising: a wide malleable metal ribbon of predetermined length, said wide malleable metal ribbon containing a series of V-shaped notches within and spaced evenly along each of said ribbon's right and left side edges.

38. An electric discharge machining apparatus, comprising:

a tool guide;

a discharge electrode, said discharge electrode comprising an elongate wide metal ribbon, said wide metal ribbon containing a series of notches within and spaced evenly along each of said ribbon's right and left side edges;

motor means for incrementally advancing said discharge electrode through said tool guide;

forming means, located within said tool guide, for shaping said ribbon from a straight cross section into a curved cross section responsive to said ribbon's advance there through and for bending said ribbon into a circular curve as said ribbon exits said tool holder to define an exposed electrode portion formed into a circular arc, whereby said circular curve increases in arc as said ribbon is advanced out said tool holder to increase the length of said exposed electrode portion.

* * * * *